US012725397B2

(12) United States Patent
Jain et al.

(10) Patent No.: US 12,725,397 B2
(45) Date of Patent: Sep. 1, 2026

(54) SYSTEM AND METHOD FOR PROVIDING DIGITAL GUIDANCE CORRESPONDING TO SOFTWARE APPLICATIONS

(71) Applicant: Whatfix Private Limited, Bangalore (IN)

(72) Inventors: Abhilash Jain, Bangalore (IN); Vibhu Rawat, Bangalore (IN)

(73) Assignee: Whatfix Private Limited (IN)

( * ) Notice: Subject to any disclaimer, the term of this patent is extended or adjusted under 35 U.S.C. 154(b) by 244 days.

(21) Appl. No.: 18/791,499

(22) Filed: Aug. 1, 2024

(65) Prior Publication Data

US 2025/0130827 A1 Apr. 24, 2025

Related U.S. Application Data

(63) Continuation of application No. 18/791,482, filed on Aug. 1, 2024, and a continuation-in-part of (Continued)

(30) Foreign Application Priority Data

Jun. 25, 2024 (IN) ............................ 202441046638

(51) Int. Cl.
*G06F 9/451* (2018.01)
*G06T 3/40* (2006.01)
(Continued)

(52) U.S. Cl.
CPC ................ *G06F 9/453* (2018.02); *G06T 3/40* (2013.01); *G06T 5/20* (2013.01); *G06T 5/70* (2024.01);
(Continued)

(58) Field of Classification Search
CPC ....... G06F 9/453; G06F 3/04842; G06T 5/20; G06T 5/70; G06T 5/73; G06T 3/40;
(Continued)

(56) References Cited

U.S. PATENT DOCUMENTS 5,457,754 A 10/1995 Han et al.
5,579,360 A 11/1996 Abdel-Mottaleb
(Continued)

FOREIGN PATENT DOCUMENTS

CN 104091147 B 8/2017
CN 112506600 A 3/2021
(Continued)

OTHER PUBLICATIONS

Sergeevna (Computer English Translation of Russian Patent No. RU2609069 C2). pp. 1-18. (Year: 2017).*

*Primary Examiner* — Daniel G Mariam

(57) ABSTRACT

A method for providing digital guidance corresponding to software applications comprises acquiring an image of a current UI of a software application. A template image of an element of interest may be obtained from a previously processed template UI image corresponding to the current user interface. The obtaining of the template image may comprise obtaining bounding boxes using binary images of the template UI. Each bounding box may encapsulate a potential element of interest. Further the method may include receiving a selection of a bounding box corresponding to the element of interest among the potential element of interest. The element of interest may be identified in the current UI by using the template image of the element of interest and the image of the current UI. Subsequently, the digital guidance associated with the element of interest may be displayed in the current UI.

20 Claims, 33 Drawing Sheets
(19 of 33 Drawing Sheet(s) Filed in Color)

Related U.S. Application Data application No. 18/493,549, filed on Oct. 24, 2023, now Pat. No. 12,405,812.

(51) Int. Cl.

| | |
|---|---|
| ***G06T 5/20*** | (2006.01) |
| ***G06T 5/70*** | (2024.01) |
| ***G06T 5/73*** | (2024.01) |
| ***G06T 11/60*** | (2006.01) |
| ***G06V 10/75*** | (2022.01) |
| ***G06V 30/414*** | (2022.01) |

(52) U.S. Cl.

CPC ................ *G06T 5/73* (2024.01); *G06T 11/60* (2013.01); *G06V 10/751* (2022.01); *G06V 30/414* (2022.01); *G06T 2200/24* (2013.01); *G06T 2207/20016* (2013.01); *G06T 2207/20021* (2013.01); *G06T 2210/32* (2013.01)

(58) Field of Classification Search

CPC ... G06T 11/60; G06T 2200/24; G06V 10/751; G06V 30/414

See application file for complete search history.

(56) References Cited

U.S. PATENT DOCUMENTS

| | | | | |
|---|---|---|---|---|
| 7,020,307 | B2 | 3/2006 | Hinton et al. | |
| 8,126,253 | B2 | 2/2012 | Wallack et al. | |
| 8,355,079 | B2 | 1/2013 | Zhang et al. | |
| 10,360,473 | B2 * | 7/2019 | Dixon .................. | G06V 10/235 |
| 11,194,448 | B2 * | 12/2021 | Rezazadeh Sereshkeh ................. | G06F 3/167 |
| 11,216,905 | B2 | 1/2022 | Leordeanu et al. | |
| 11,475,170 | B2 | 10/2022 | Hershman et al. | |
| 11,887,392 | B2 | 1/2024 | Slattery | |
| 12,046,019 | B2 * | 7/2024 | Singh ...................... | G06F 18/22 |
| 2015/0039637 | A1 * | 2/2015 | Neuhauser ............. | G06V 20/62 707/758 |
| 2018/0157386 | A1 * | 6/2018 | Su .................... | G06V 30/19173 |

FOREIGN PATENT DOCUMENTS

| | | | | | |
|---|---|---|---|---|---|
| JP | 2014063019 | A | | 4/2014 | |
| RU | 2609069 | C2 | * | 1/2017 | ........... G06V 30/153 |

* cited by examiner

302

402

602b

FIG. 6C
Jacobs
Client Success
EHS IM - Toyota - EHS Organizational Transformation
Summary
Details
Financials
Reviews
Win Plan Tools
Win Plan Narrative
More
Opportunity Description
Actions & Recommendations
Actions
History
Add
Mark Stage as Complete
Chatter
Documents
Topics (2)
Self Help

602c

702b

702c

802b

802c

1402

1902

2202b

2202a

2302a

2302b

2502

2402

SYSTEM AND METHOD FOR PROVIDING DIGITAL GUIDANCE CORRESPONDING TO SOFTWARE APPLICATIONS

CROSS-REFERENCE TO RELATED APPLICATIONS

This application is a continuation of U.S. patent application Ser. No. 18/791,482, filed Aug. 1, 2024. Further, this application is a continuation in part of U.S. patent application Ser. No. 18/493,549, filed Oct. 24, 2023.

BACKGROUND

Field

The disclosed technology relates generally to the field of image processing and digital guidance for adoption of software applications. More particularly, the technology pertains to detecting elements present in a digital User Interface (UI) to enable guiding an end user adopt software applications.

Description of the Related Art

Software applications are increasingly utilized across various fields for numerous purposes, including enterprise resource planning, customer relationship management, and sales automation, among others. These applications are designed with a broad spectrum of features to enhance productivity and capabilities. Yet, if end users struggle to fully leverage these applications, the potential benefits are diminished. Despite users' motivation, the complexity and diversity of features can make adopting these applications challenging.

The need to address digital adoption challenges is well recognized. Typically, developers or authors often create Frequently Asked Questions (FAQs) to facilitate easier adoption of their applications. However, finding relevant sections and understanding answers within the correct context can be cumbersome for users. Recognizing these challenges, there has been a shift towards integrating step-by-step guidance directly within the software. This includes pop-up instructions linked to various elements, in the user interface of the software application, like dropdown menus, clickable buttons, and input fields, making it easier for users to navigate and use the application.

Implementing step-by-step guidance that connects to specific elements involves technical challenges, especially when creating and displaying these instructions. This is even more complex when a third party, separate from the original software developer, undertakes the development of these instructions, due to limited control over any subsequent changes to the software application.

A conventional technique for identifying UI elements may involve using their HTML attributes. Yet, this approach can encounter difficulties if these attributes change. As an alternative, computer vision could be employed to recognize these elements. However, conventional computer vision models seem to underperform in the context of element detection in digital user interface.

In view of the foregoing, there is a need for an improved technique for detecting elements in a digital User Interface (UI) to enable guiding of end users adopt software applications.

SUMMARY

In one aspect a method for detecting potential elements of interest present in digital user interfaces is disclosed. A data processing system comprising one or more processors is configured to execute the method. The method may include receiving a grayscale image of a user interface comprising multiple elements. The grayscale image may be formed of pixels. Multiple threshold values corresponding to the pixels may be identified and selected by processing the grayscale image. Multiple binary images may be thereafter generated. Each of the binary images may correspond to a respective one of the threshold values. Thereafter, multiple sets of one or more bounding boxes may be obtained. Each of the sets may correspond to a respective one of the binary images. Each of the bounding boxes may encapsulate a respective one or more of the elements. Subsequently, one or more bounding boxes may be obtained, each one encapsulating a respective one of the potential elements of interest among the elements present in the user interface, by processing the multiple sets of bounding boxes.

In another aspect a method for providing digital guidance corresponding to software applications is disclosed. A data processing system comprising one or more processors may be configured to execute the method. The method may include acquiring an image of a current user interface of a software application. A template image of an element of interest may be obtained from a previously processed template user interface image corresponding to the current user interface. The obtaining of the template image of the element of interest may comprise obtaining bounding boxes using a plurality of binary images of the template user interface. Each of the bounding boxes may encapsulate a respective one of a potential element of interest among elements present in the template user interface image. Further the method may include receiving a selection of at least one of the bounding boxes, wherein the selected bounding box may correspond to the element of interest among the potential element of interest. The element of interest may be identified in the current user interface by using the template image of the element of interest and the image of the current user interface. Subsequently, the digital guidance associated with the element of interest may be displayed in the current user interface.

BRIEF DESCRIPTION OF DRAWINGS

The patent or application file contains at least one drawing executed in color. Copies of this patent or patent application publication with color drawing(s) will be provided by the Office upon request and payment of the necessary fee.

Embodiments are illustrated by way of example and not limitation in the figures of the accompanying drawings, in which like references indicate similar elements and in which.

DETAILED DESCRIPTION

Embodiments of the disclosed technology enable implementing digital guidance for using software applications. A software application for which digital guidance may need to be implemented may include several elements that may be displayed as part of its user interface. Tailored tasks may have to be created for some of these elements as part of implementing digital guidance, thereby facilitating easier adoption of the software application by the users of the software application. Such an implementation may broadly involve detection of potential elements of interest in the digital User Interface (digital UI) of the software application, enabling the creation of tailored tasks for the elements-of-interest among the elements previously detected and eventually navigating an end user as per the tailored tasks when the end user accesses the software application, thereby facilitating easier adoption of the software application.

Figure 1A:
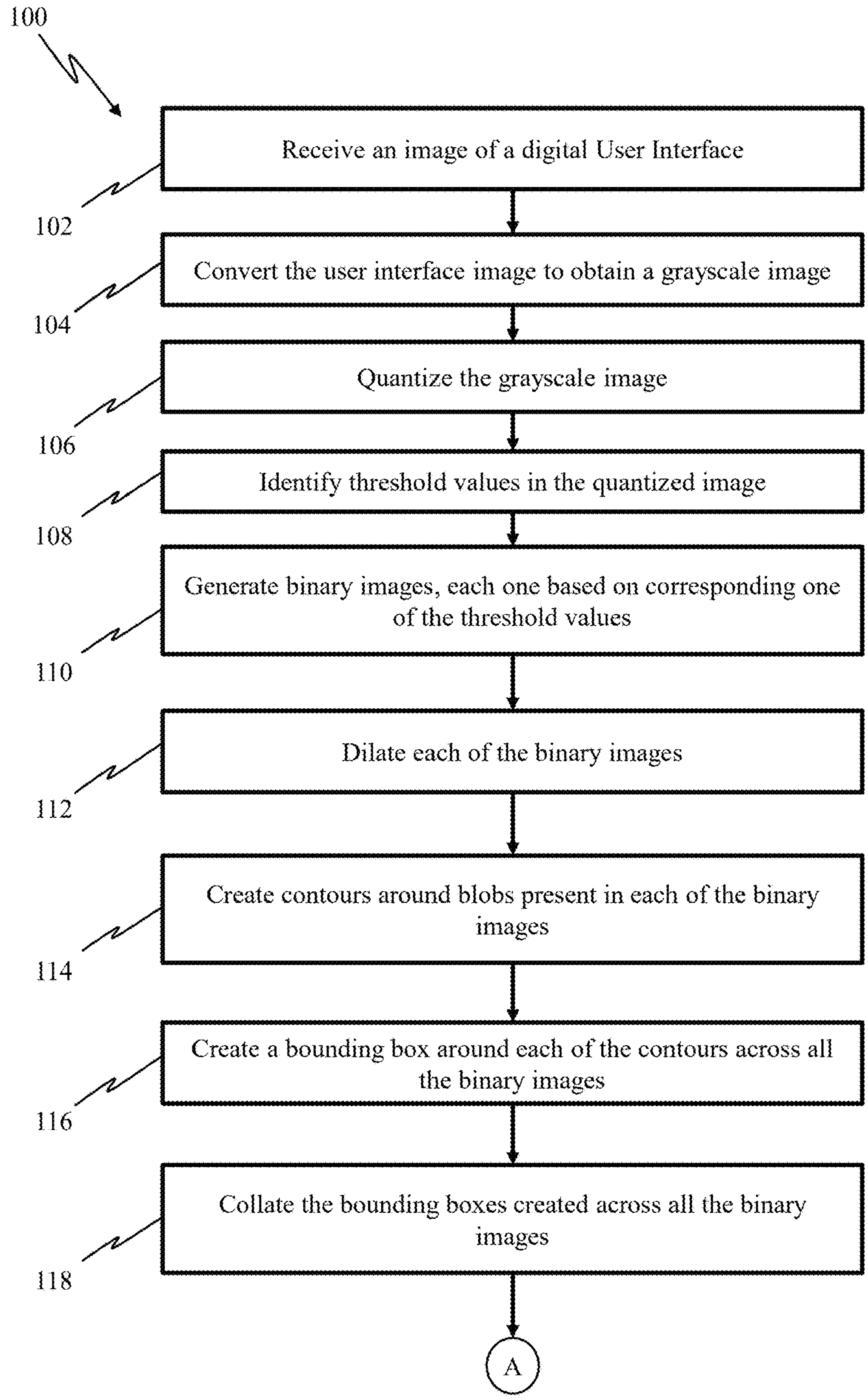
FIGS. 1A-1B illustrates a flowchart 100 for detecting elements present in a digital UI, in accordance with an embodiment.
Figure 1B:
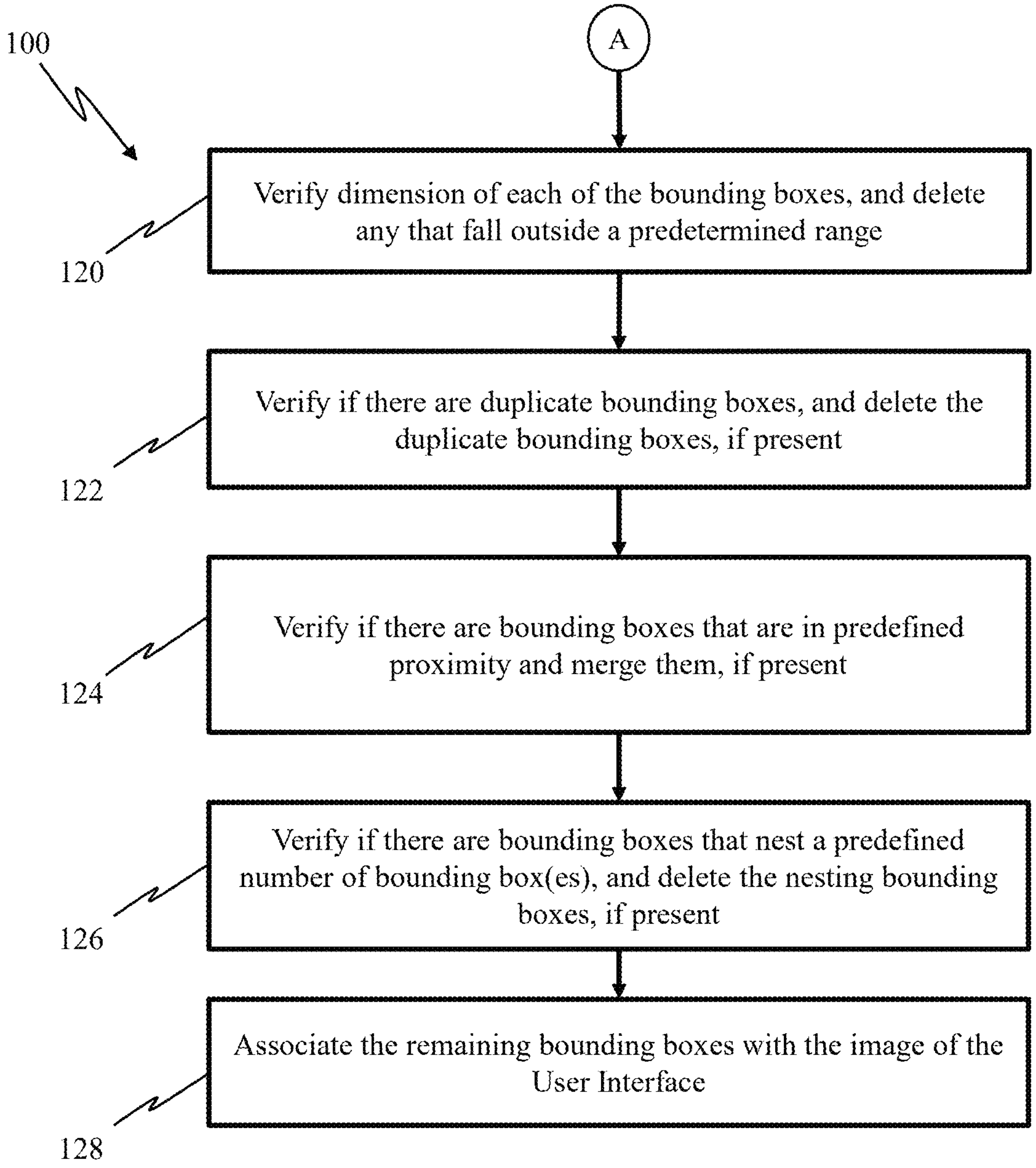

We will now discuss a method 100 of detecting potential elements of interest present in a digital UI while referring to FIG. 1A-1B, in accordance with an embodiment. The method may be executed by a data processing system. An example configuration of the data processing system is discussed later. Each of the steps of the method is discussed in brief initially, and thereafter dealt with in greater detail.

At step 102, the data processing system may receive an image of a digital UI of a software application.

At step 104, the digital UI image may be converted into a grayscale image.

At step 106, the grayscale image may be quantized to obtain a quantized grayscale image.

At step 108, threshold values corresponding to pixels of the quantized grayscale image may be identified.

At step 110, multiple binary images may be generated, wherein each of the binary images generated may correspond to one of the threshold values.

At step 112, each of the binary images may be dilated.

At step 114, contours can be generated around blobs found in each binary image. These blobs are formed as a result of the dilation process that took place in the preceding step.

At step 116, bounding box is created encapsulating each of the contours, across all the binary images.

At step 118, the bounding boxes created across all the binary images are collated.

At step 120, dimension of each bounding box is verified, and any of the bounding box having a dimension falling outside a predetermined range is deleted.

At step 122, the process checks for any duplicate bounding boxes and eliminates duplication, if found.

At step 124, the process checks if there are bounding boxes that are in predefined proximity from each other and merges them, if present.

At step 126, the process checks if there are bounding boxes that nest a predefined number of bounding box(es), and deletes the nesting bounding boxes, if present.

At step 128, the remaining bounding boxes are associated with digital UI image.

The above-described flowchart 100 will be explained below in greater detail in accordance with an example embodiment.

Figure 2:
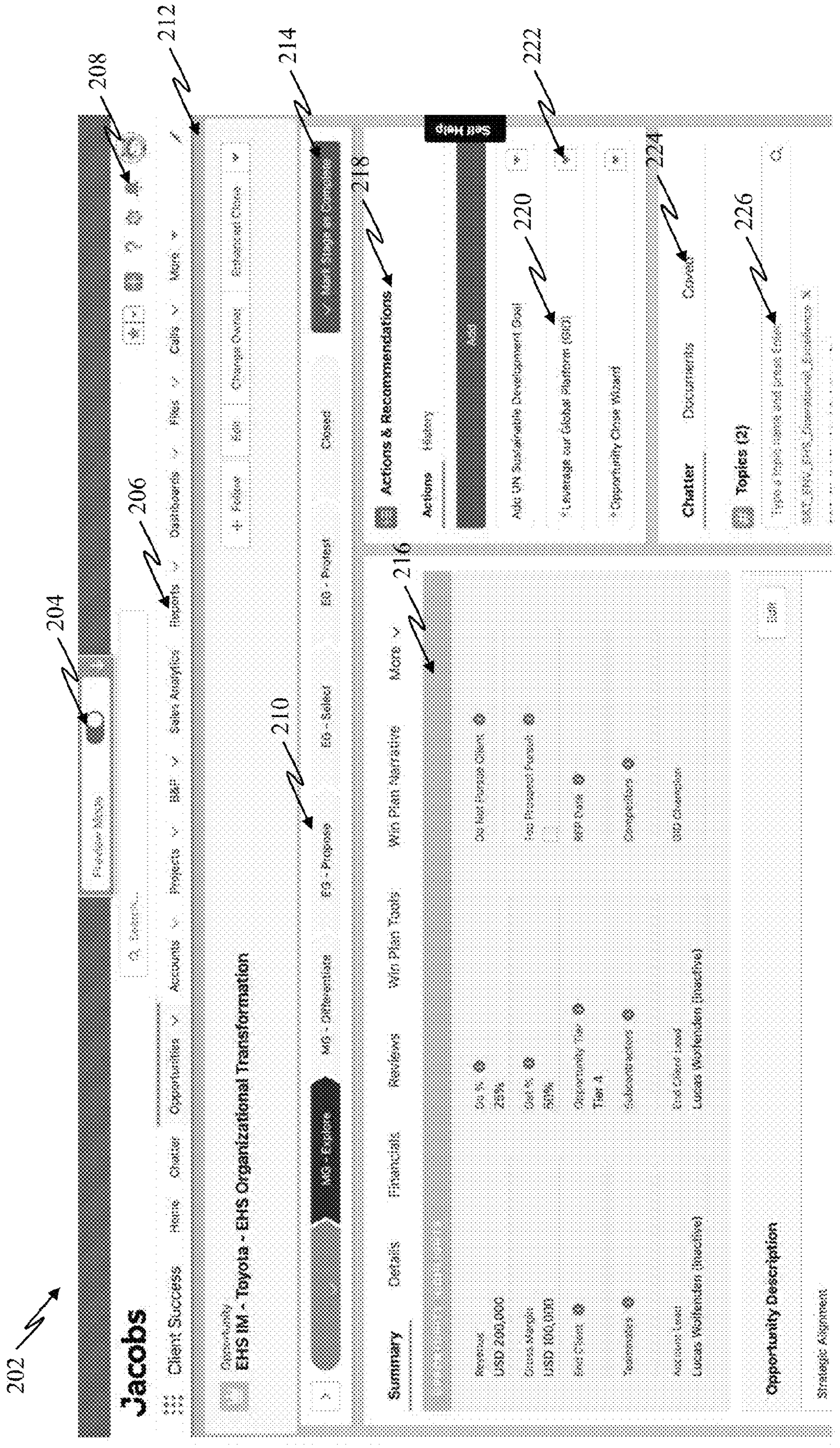
FIG. 2 depicts a digital UI image 202 of a software application, in accordance with an example embodiment.

FIG. 2-14 depicts a series of example embodiments illustrating detecting potential elements-of-interest present in an example user interface. FIG. 2, depicts a digital UI image 202 of a software application being displayed on a digital display.

In an embodiment, the software application may be a web application being accessed from the data processing system. The software application may be associated with a digital guidance plugin configured to allow the author to create tasks. The web application may allow the author to create a step for the intended task to be created. Upon receiving an input to create the task, the digital guidance plugin in coordination with a web application Development Tools Protocol (DTP) may be configured to capture a screenshot of the digital UI being displayed to the author.

In an embodiment, the software application may be a desktop application. A digital guidance application may allow the author to create a step for the intended task to be created. The desktop application may be configured to capture a screenshot of the digital UI being displayed to the author and provide the digital UI image 202 to the digital guidance application.

In an embodiment, the data processing system may be configured to receive the digital UI image 202, at step 102.

In an embodiment, the digital UI 202 image may comprise of plurality of elements as shown in the FIG. 2. The elements present in the digital UI image 202 may include, but not limited to, a slider 204, a menu tab 206, an icon 208, a progress menu tab 210, a graphic bar 212, a clickable button 214, a sub-heading graphic bar 216, a sub heading text 218, a dropdown text 220, a dropdown menu button 222, a sub-menu text 224, and a text input receiving bar 226. It is to be noted that, elements in the digital UI image 202 may refer to any region of the digital UI image 202 that is displayed to the author.

Figure 3:
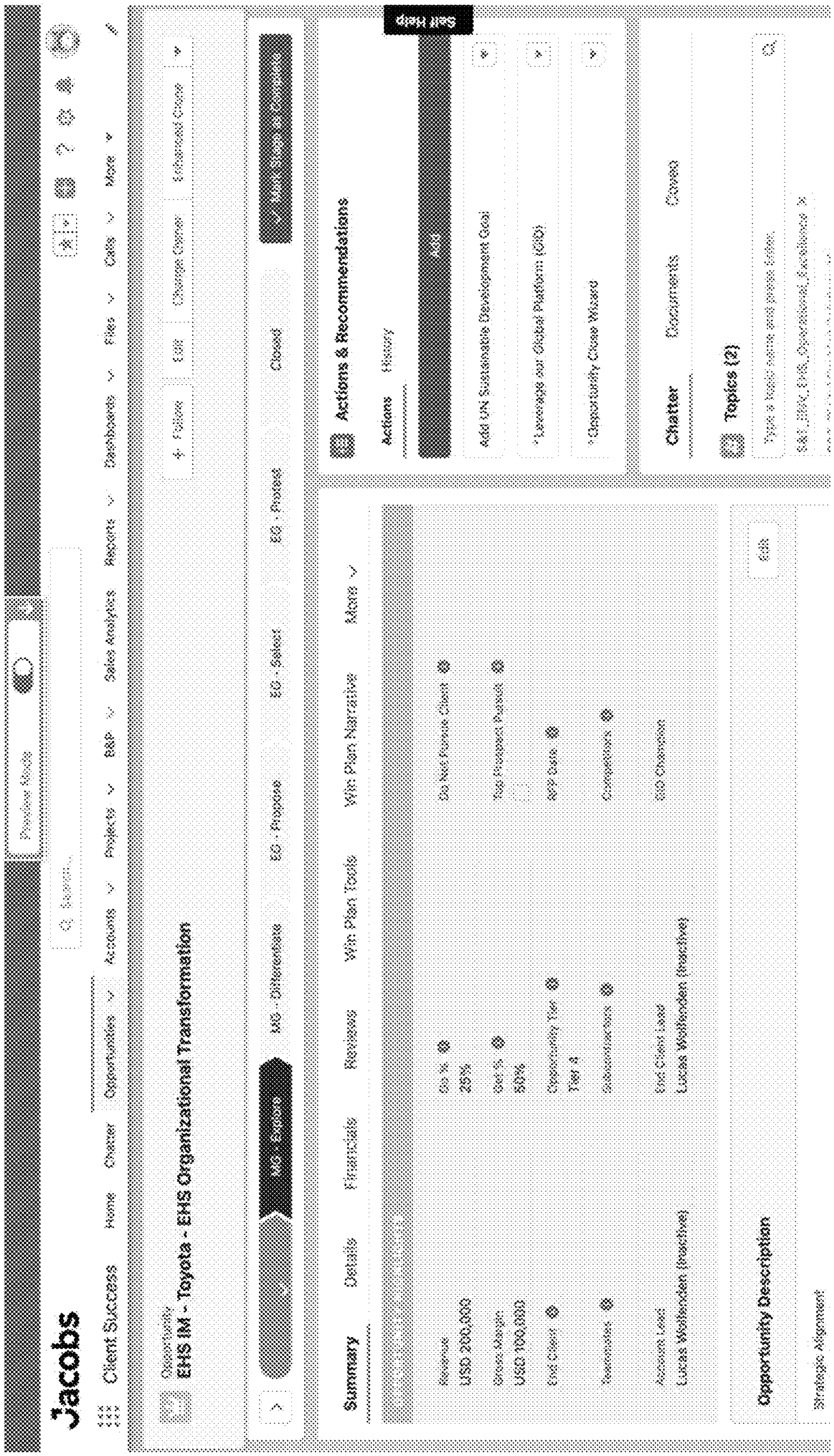
FIG. 3 depicts a converted digital UI image 202 into a grayscale image 302, in accordance with an example embodiment.

Moving on, referring to step 104, the received digital UI image 202 may be converted to a grayscale image. FIG. 3 depicts a converted digital UI image 202 into a grayscale image 302. The digital UI image 202 may comprise of plurality of pixels depicting the intensity or color of the image. Converting the digital UI image 202 to the grayscale image 302 may involve transforming the digital UI image 202 from a representation with multiple color channels (e.g., red, green, blue) to a single-channel representation that represents the intensity or brightness of each pixel. Each of the pixels of the grayscale image 302 may be represented by an unsigned value of at least 8-bits. As an example, the RGB color pixel (100, 150, 200) may be converted to an 8-bit grayscale pixel with a value of 10001111.

In an embodiment, converting the digital UI image 202 may involve employing the well-known 'weighted average method'. Further, predefined functions provided by OPENCV such as, but not limited to, cv.COLOR_GRAY2RGB or cvtColor( ) may be employed. It may be noted that OpenCV is a free, open-source library.

Figure 4:
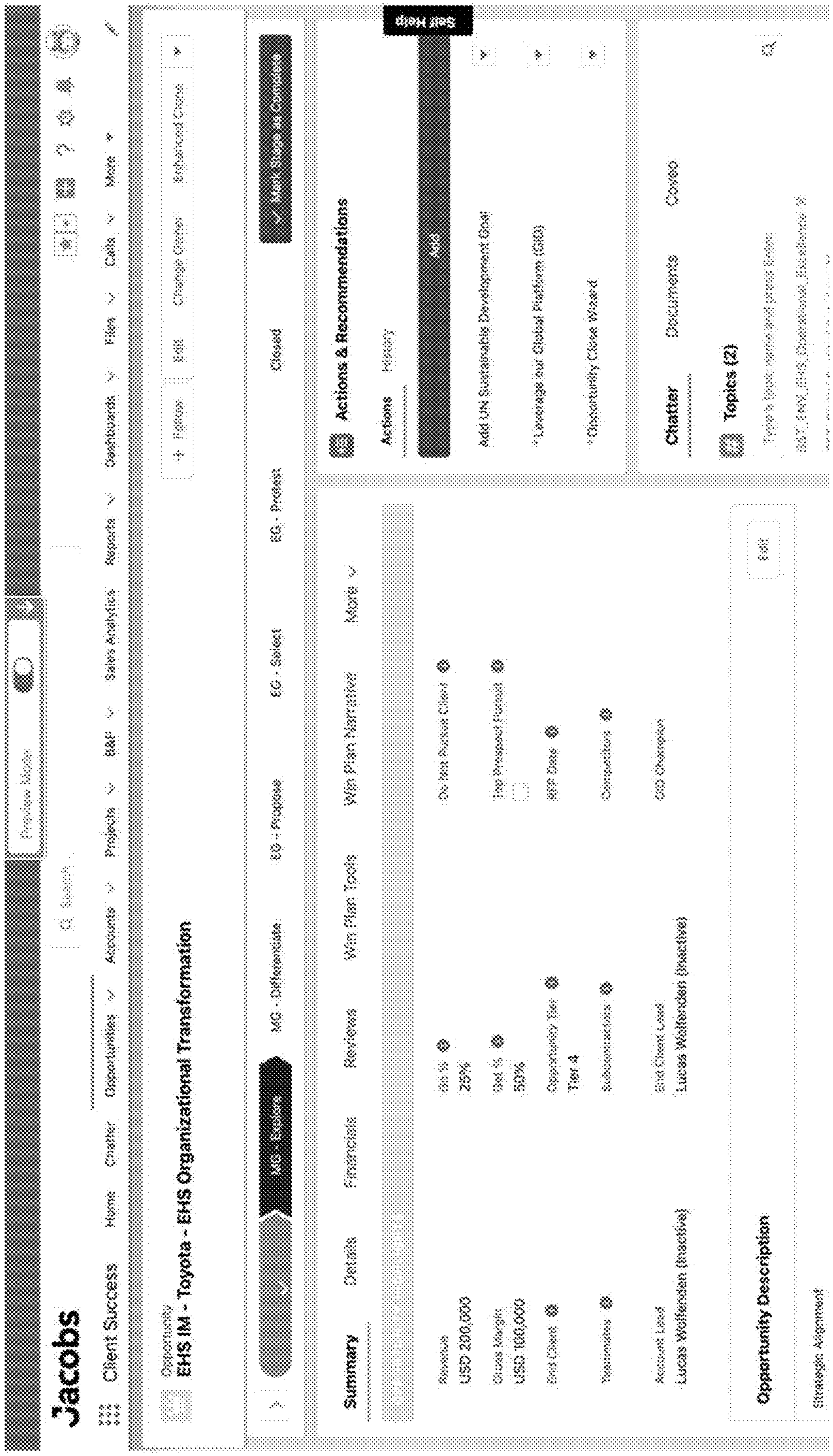
FIG. 4 depicts converted grayscale image 302 into a quantized grayscale image 402, in accordance with an example embodiment.

Referring to step 106, the grayscale image 302 may be quantized to generate a quantized grayscale image. FIG. 4 depicts converted grayscale image 302 into a quantized grayscale image 402. The data processing system may be configured to generate a quantized unsigned value for each of the pixels making up the grayscale image 302. Quantizing may involve retaining a predefined number of bit positions sequentially starting from the most significant bit, while converting the rest of the bits to zero, across all the pixels.

As an example, the data processing system may generate a quantized unsigned value for each of the plurality of pixels, wherein three-bit positions sequentially starting from the most significant bit remain unchanged, while the 5 remaining bits are changed to zero, across all the pixels. Therefore, a pixel value of '10111101' may be converted to '10100000'. Upon quantization of the grayscale image 302, the number of quantized unsigned values associated with the quantized grayscale image 402 may reduce to 8 from 256 values.

Figure 5A:
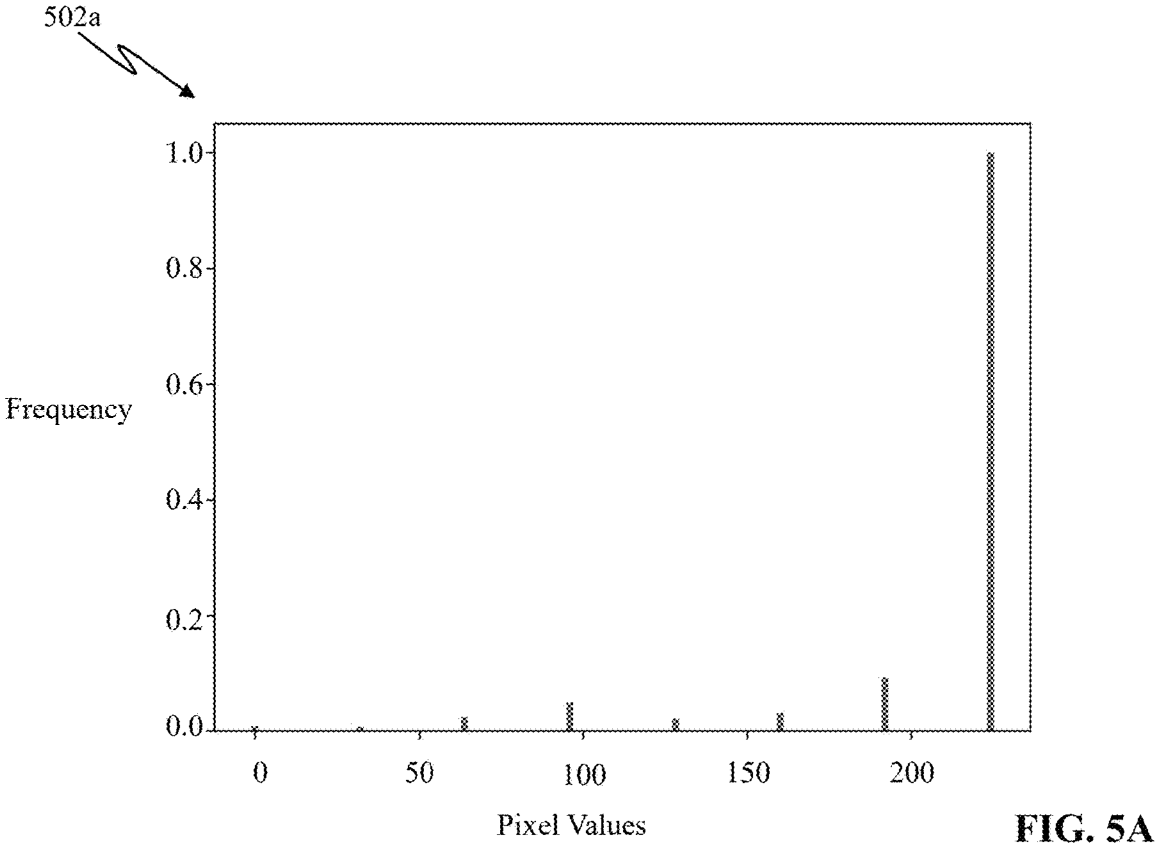
FIG. 5A depicts a histogram 502*a* generated for the quantized grayscale image 402, in accordance with an example embodiment.
Figure 5B:
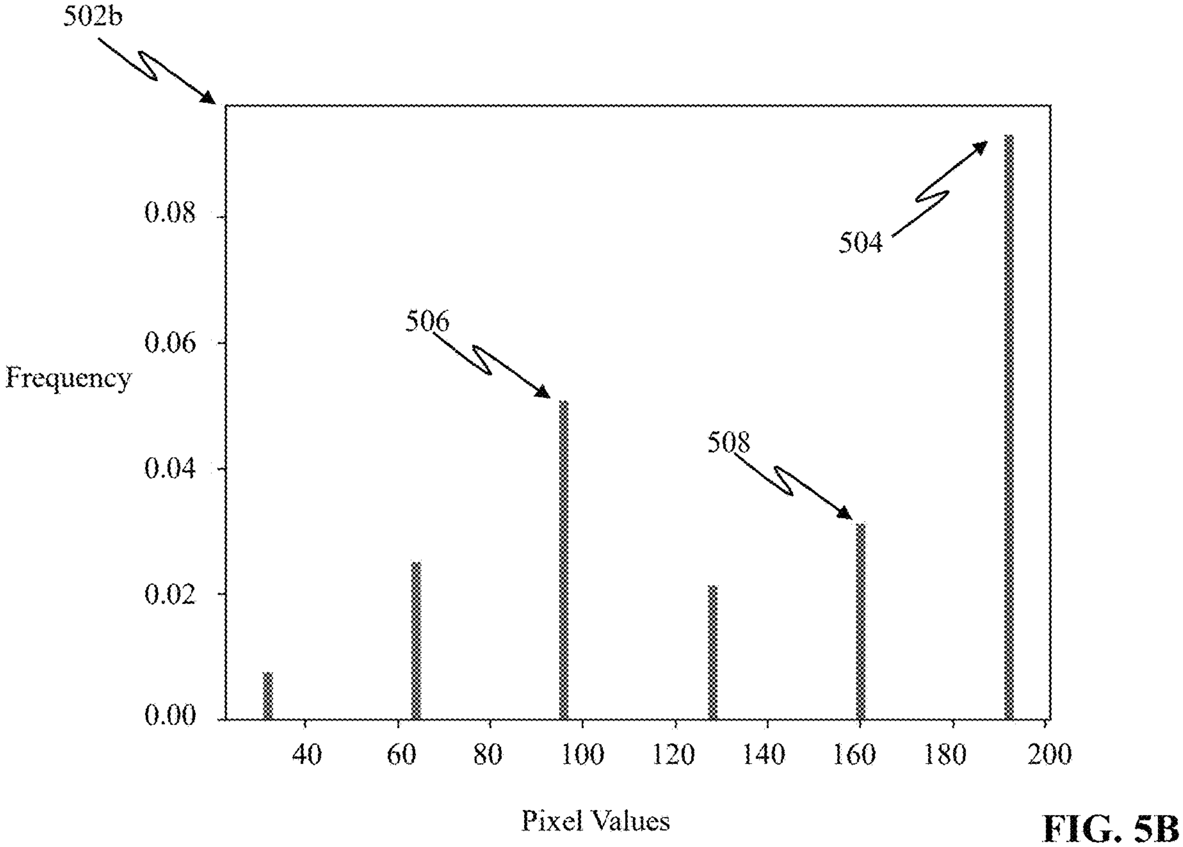
FIG. 5B depicts a histogram 502*b*, being an enlarged view of the histogram 502*a* of FIG. 5A, with exclusion of a highest frequency pixel value, in accordance with an example embodiment.

Moving further, referring to step 108, the data processing system may be configured to create histogram of the pixel values for the quantized grayscale image 402 to determine threshold values. FIG. 5A depicts a histogram 502*a* generated for the pixel values of the quantized grayscale image 402. The histogram 502*a* may display frequency of each of the 8 quantized unsigned values. Further, the data processing system may be configured to exclude the quantized unsigned value with the highest frequency and select a predefined number of the next highest frequencies of pixel values as threshold values. As an example, the second, third and fourth highest frequency pixel values may be considered as the first, second and third threshold values, respectively. Referring to FIG. 5B, which is an enlarged histogram 502*b*, excluding the highest frequency, the second highest frequency 504 i.e., 192 may be considered as the first threshold value, the third highest frequency 506, i.e., 160 may be considered as the second threshold value, and the fourth highest frequency 508, i.e., 96 may be considered as the third threshold value.

Referring to step 110, in an embodiment, the data processing system is configured to obtain the threshold values i.e., the second highest frequency 504 i.e., 192, the third highest frequency 506, i.e., 160, and the fourth highest frequency 508, i.e., 96, from the histogram 502*a* and generate a plurality of binary images corresponding to each of the threshold values.

The data processing system may be configured to use the threshold values to generate a plurality of binary images corresponding to each of the threshold values. The data processing system may be configured to perform thresholding on the quantized grayscale image 402 by using the threshold values 192, 160, and 96, wherein each of the quantized 8-bit pixel values greater than and equal to the threshold value is set to a maximum value, such as, 255, and each of the quantized 8-bit pixel values smaller than the threshold value is set to the minimum value, i.e., 0.

Figure 6A:
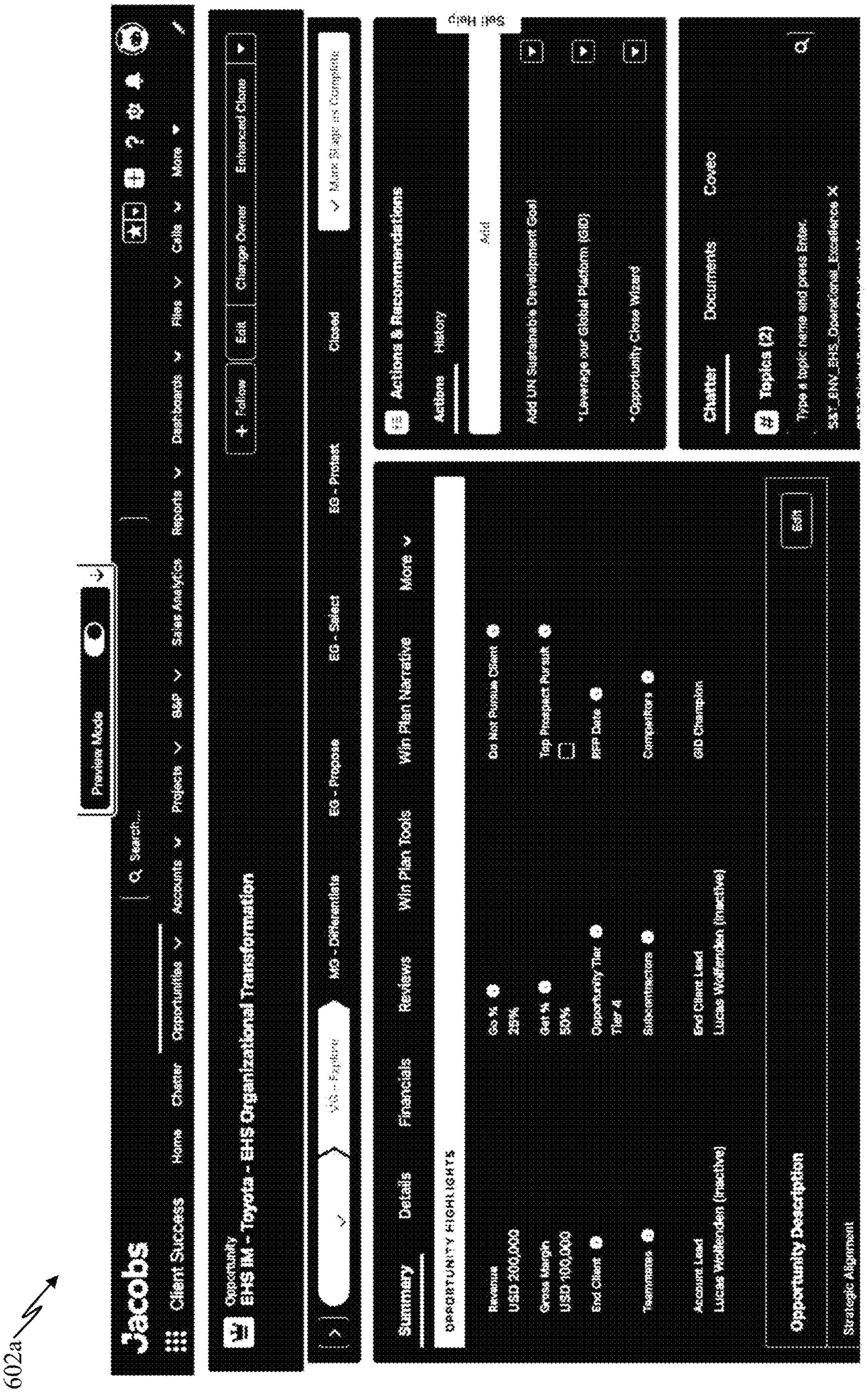
FIG. 6A depicts a first thresholded image 602*a* with the threshold value of 192, in accordance with an example embodiment.
Figure 6B:
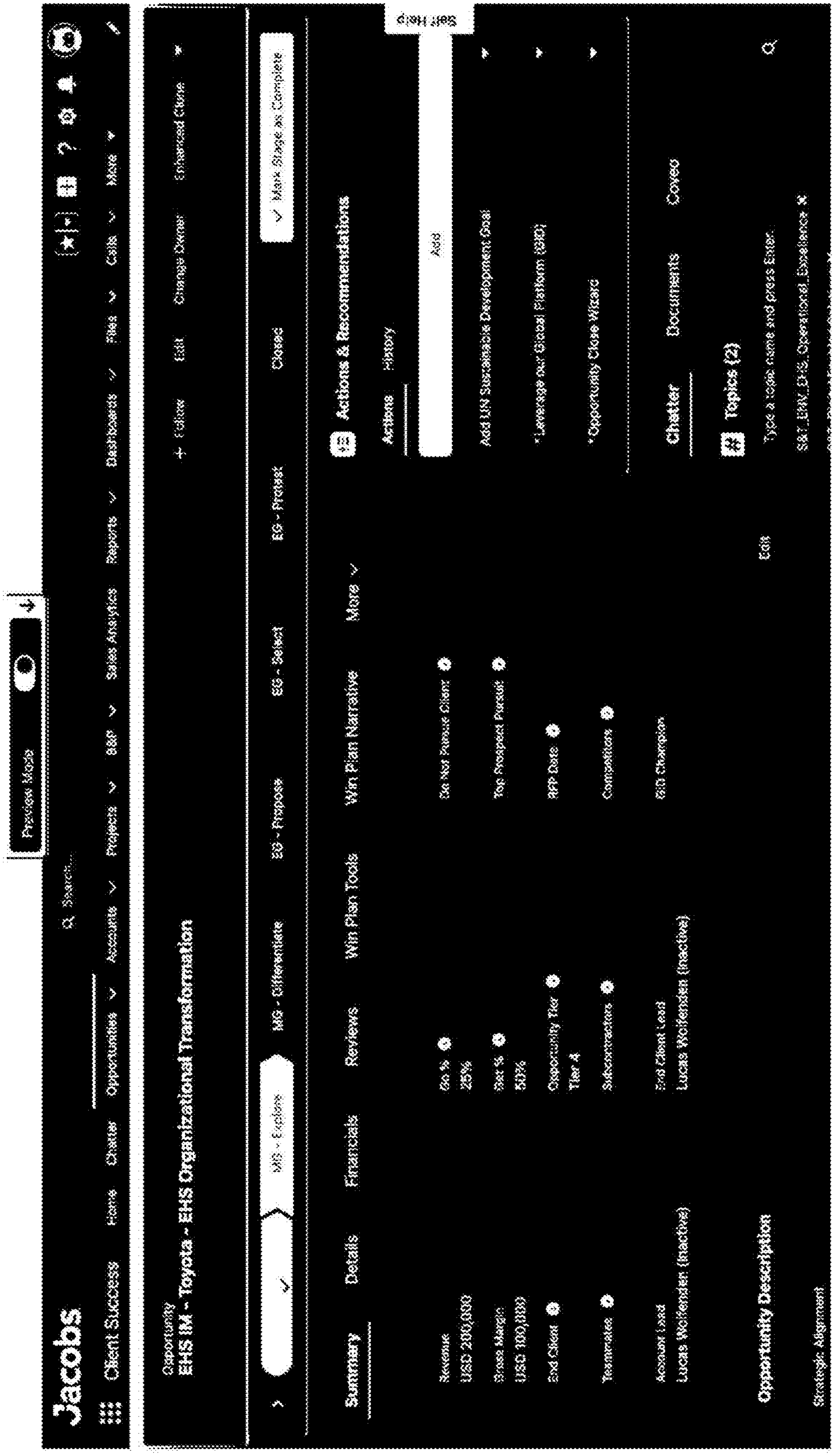
FIG. 6B depicts a second thresholded image 602*b* with the threshold value of 160, in accordance with an example embodiment.
Figure 6C:
FIG. 6C depicts a third thresholded image 602*c* with the threshold value of 96, in accordance with an example embodiment.

FIG. 6A depicts a first thresholded image 602*a* with the threshold value of 192, FIG. 6B depicts a second thresholded image 602*b* with the threshold value of 160, and FIG. 6C depicts a third thresholded image 602*c* with the threshold value of 96.

Figure 7A:
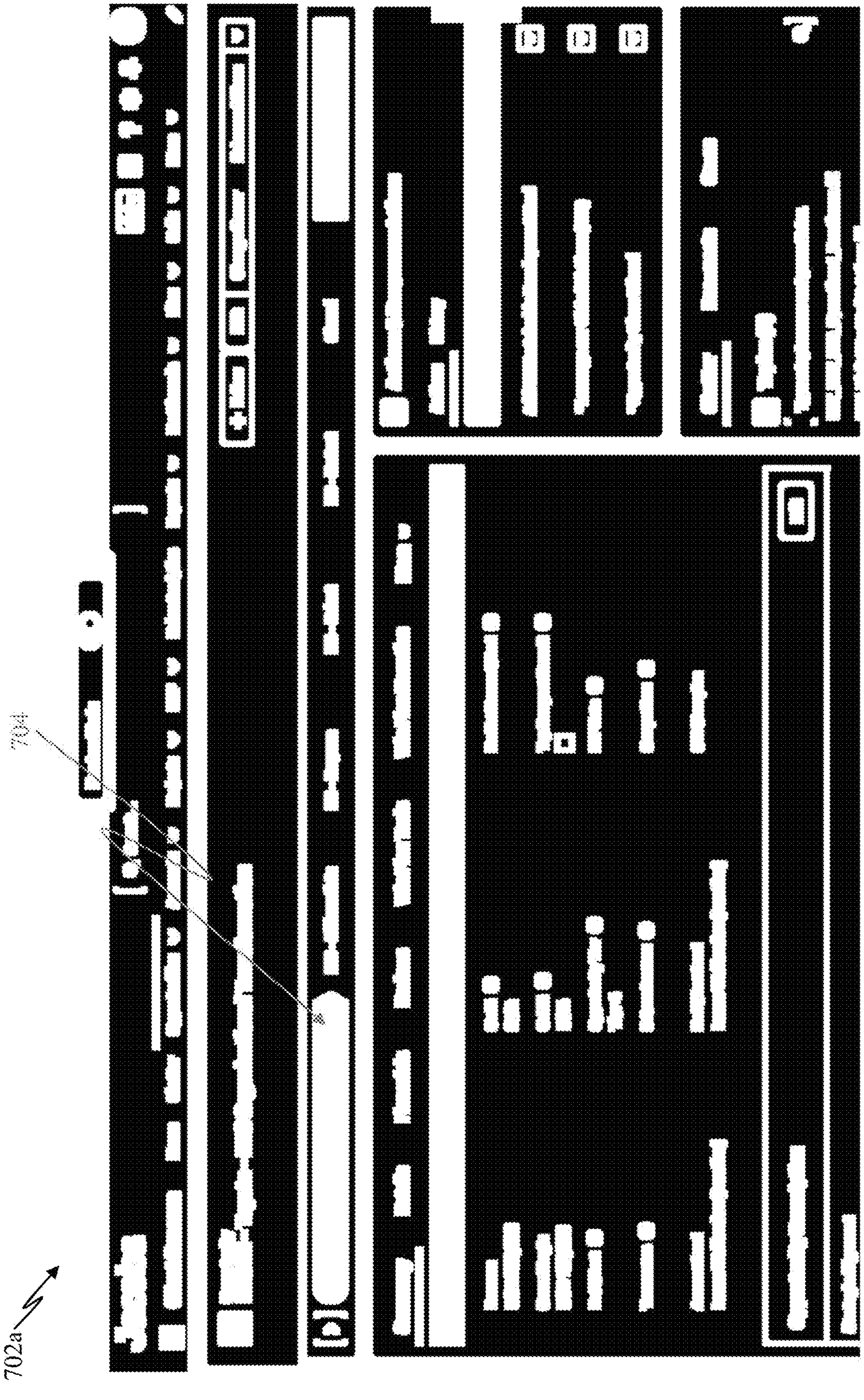
FIG. 7A depicts a first dilated image 702*a* of the first thresholded image 602*a*, in accordance with an example embodiment.
Figure 7B:
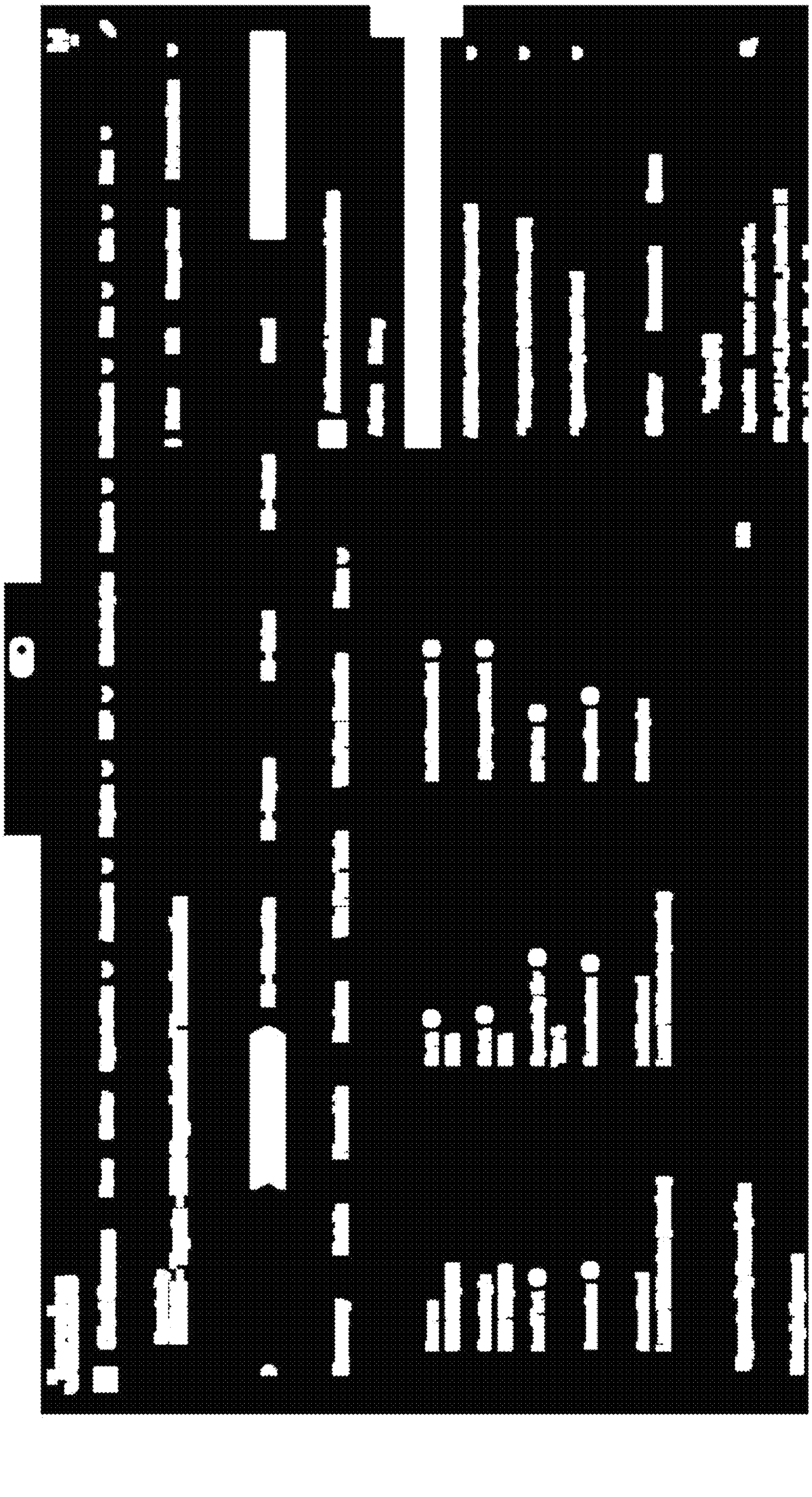
FIG. 7B depicts a second dilated image 702*b* of the second thresholded image 602*b*, in accordance with an example embodiment.
Figure 7C:
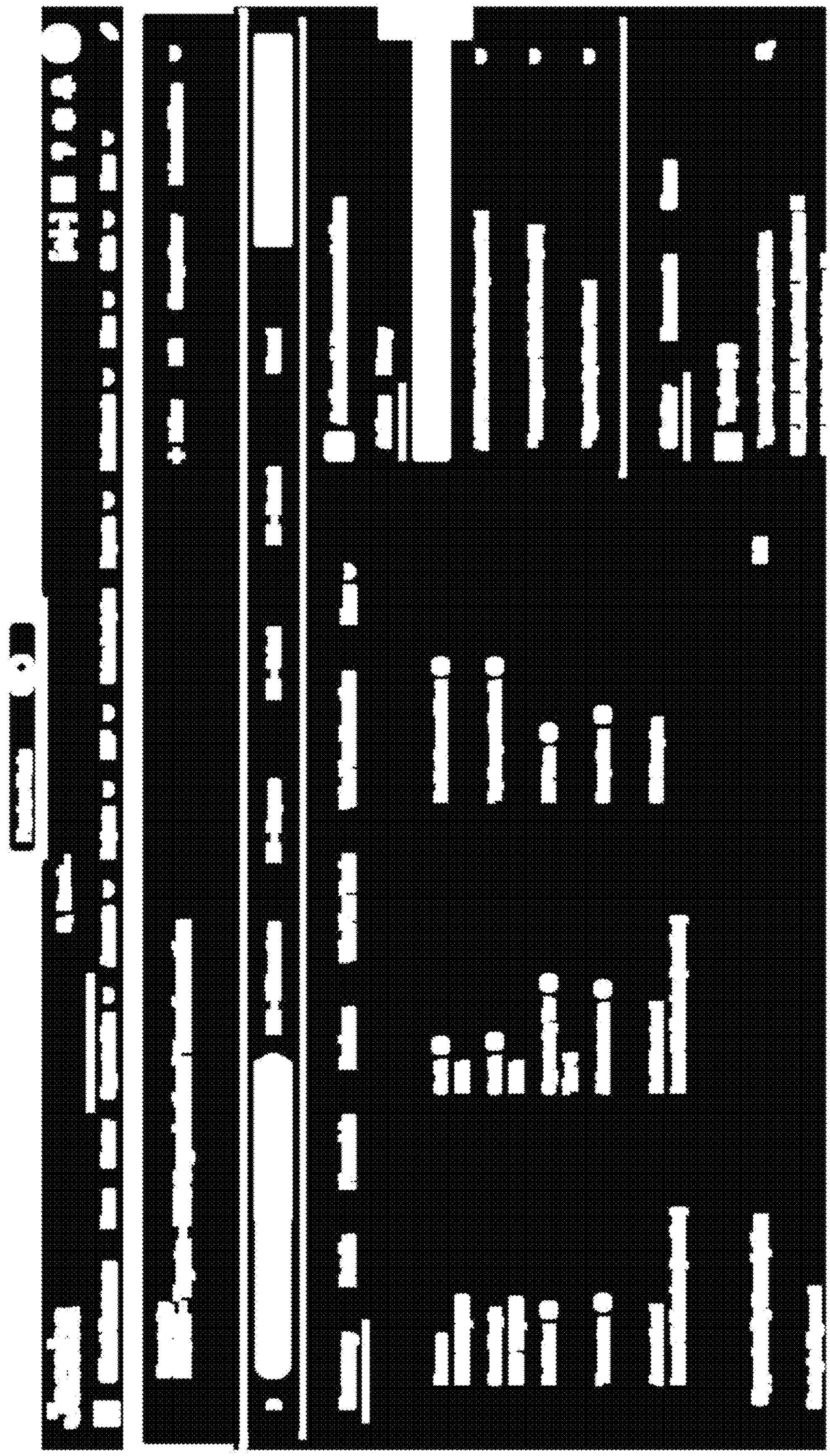
FIG. 7C depicts a third dilated image 702*c* of the third thresholded image 602*c*, in accordance with an example embodiment.

Referring to step 112, the data processing system may be configured to dilate the first thresholded image 602*a*, the second thresholded image 602_b_, and the third thresholded image 602_c_. As an example, dilation may involve increasing the size of the foreground image, resulting in formation of blobs. FIG. 7A depicts a first dilated image 702_a_, wherein the first thresholded image 224 is dilated to generate the first dilated image 702_a_. The dilation of the first thresholded image 224 may generate plurality of blobs similar to blob 704. FIG. 7B depicts a second dilated image 702_b_, wherein the second thresholded image 602_b_ is dilated to generate the second dilated image 702_b_. FIG. 7C depicts a third dilated image 702_c_, wherein the third thresholded image 602_c_ is dilated to generate the third dilated image 702_c_.

Figure 8A:
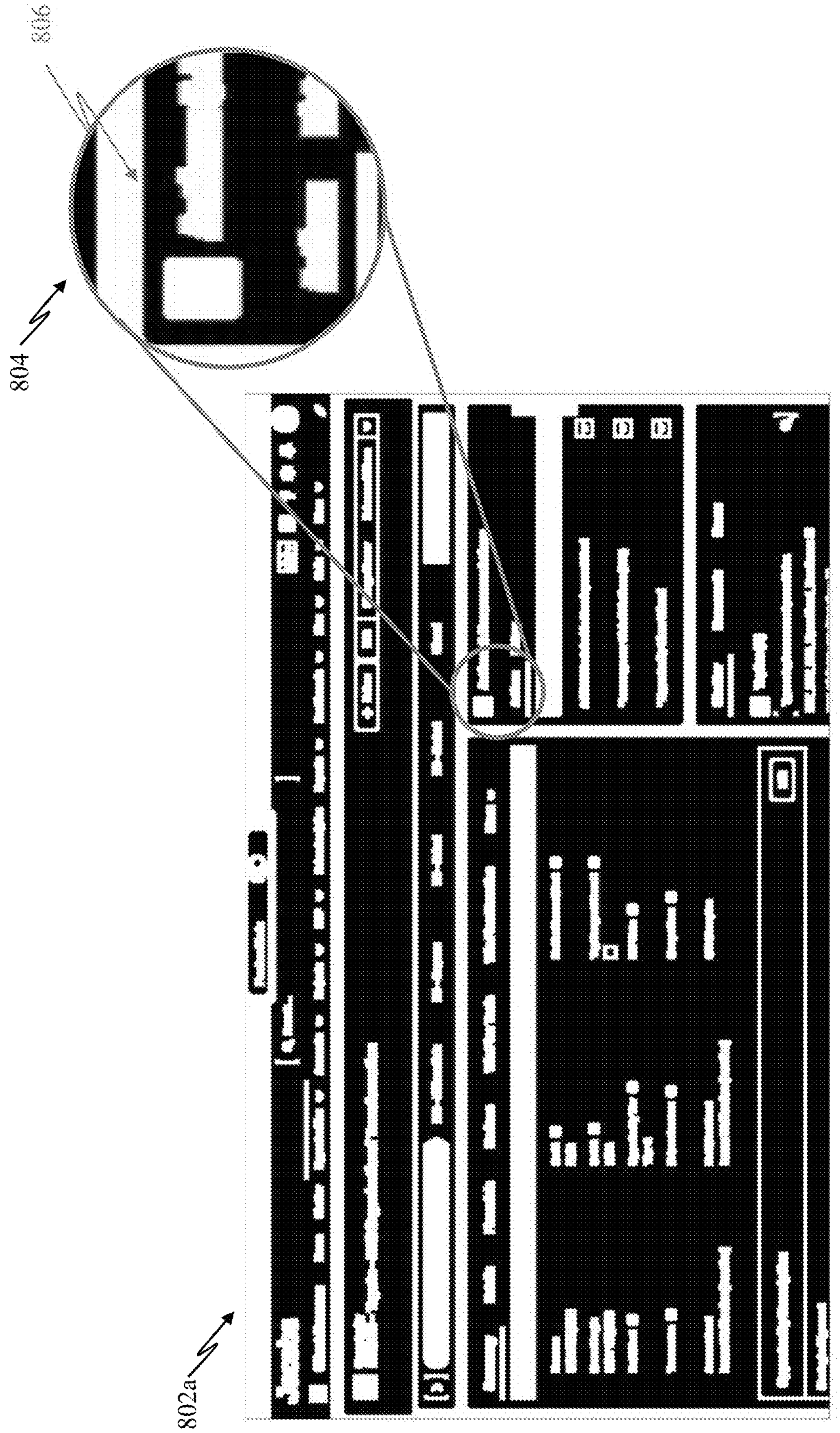
FIG. 8A depicts a first contoured image 802*a* of the first dilated image 702*a*, in accordance with an example embodiment.
Figure 8B:
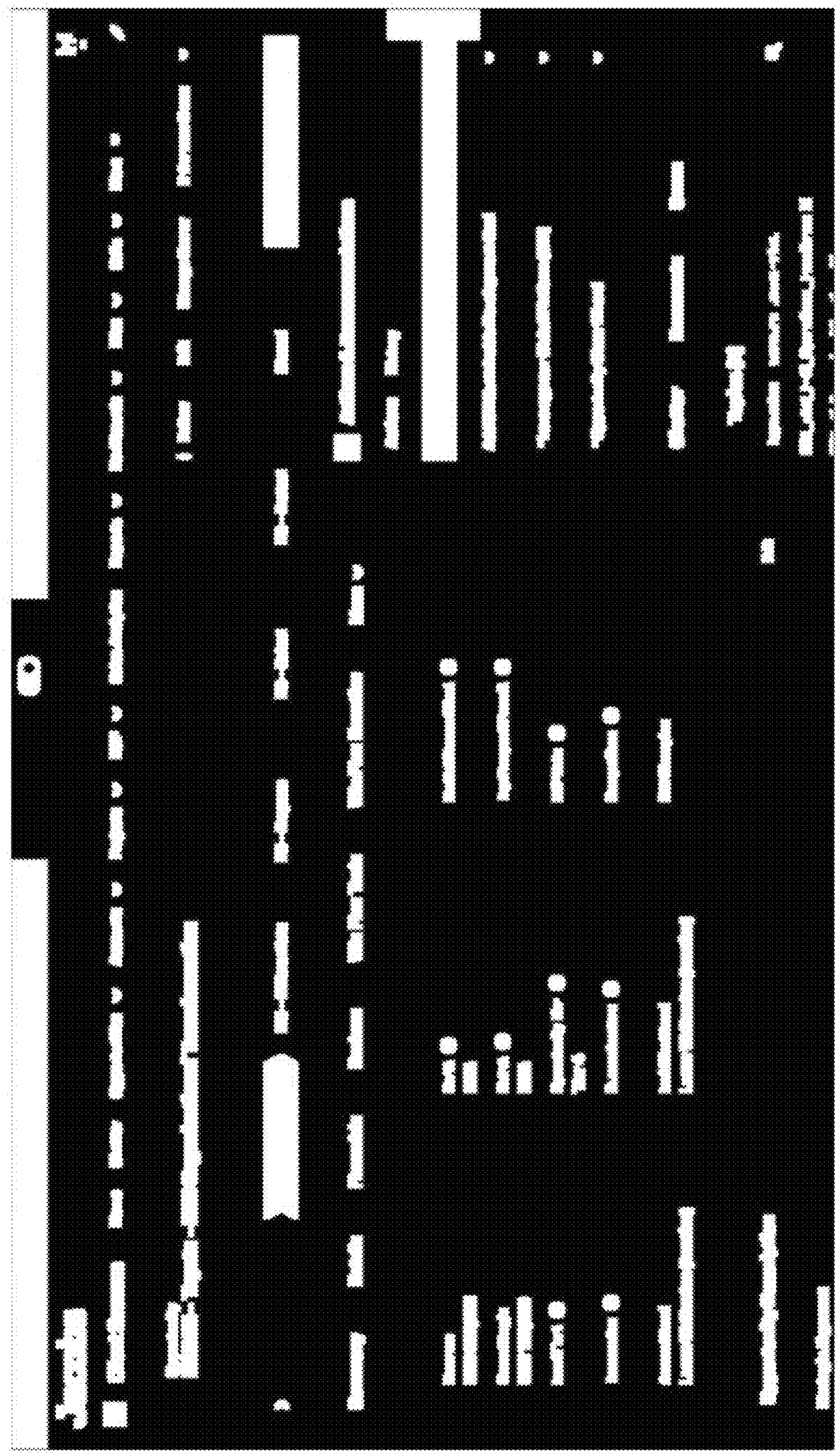
FIG. 8B depicts a second contoured image 802*b* of the second dilated image 702*b*, in accordance with an example embodiment.
Figure 8C:
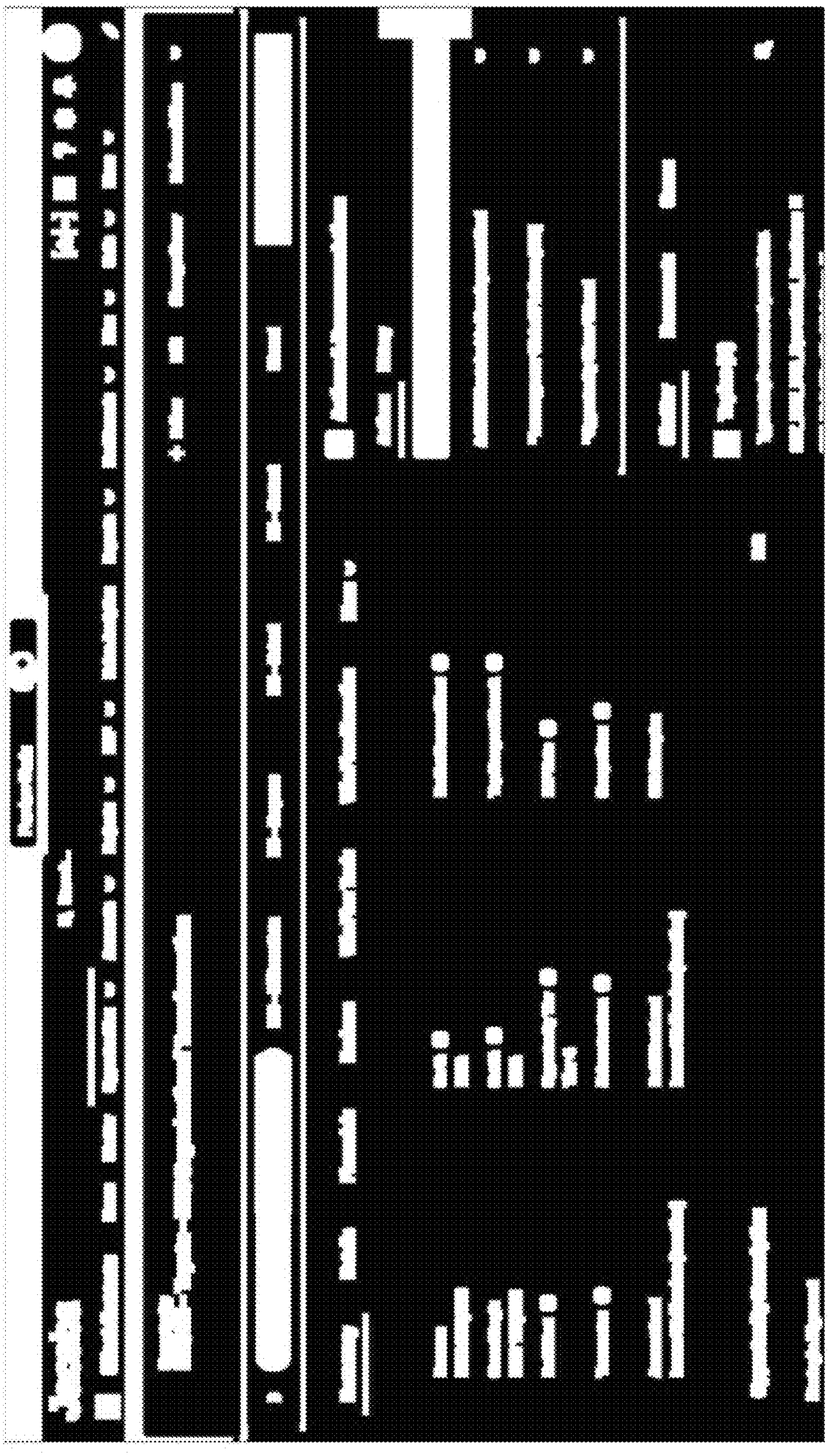
FIG. 8C depicts a third contoured image 802*c* of the third dilated image 702*c*, in accordance with an example embodiment.

Referring to step 114, the data processing system may further be configured to create contours around each of the blobs present in the first dilated image 702_a_, the second dilated image 702_b_, and the third dilated image 702_c_. FIG. 8A depicts a first contoured image 802_a_, wherein the first contoured image 802_a_ is the first dilated image 702_a_ with contours around each of the blobs present in the first dilated image 702_a_. The figure further illustrates an exploded section 804 depicting a contour 806 (represented in red color) formed around a blob present in the first dilated image 702_a_. It is to be noted that contour 806 is chosen as an example, and each blob in the first dilated image 702_a_ may comprise a contour around it. FIG. 8B depicts a second contoured image 802_b_, wherein the second contoured image 802_b_ is the second dilated image 702_b_ with contours around each of the blobs present in the second dilated image 702_b_. FIG. 8C depicts a third contoured image 802_c_, wherein the third contoured image 802_c_ is the third dilated image 702_c_ with contours around each of the blobs present in the third dilated image 702_c_.

In an embodiment, creating contours around each of the blobs present in the dilated images (702_a_, 702_b_, and 702_c_) may involve employing pre-defined functions of OPENCV. In some cases, predefined functions provided by OPENCV such as, but not limited to, findContours( ) may be employed.

Figure 9A:
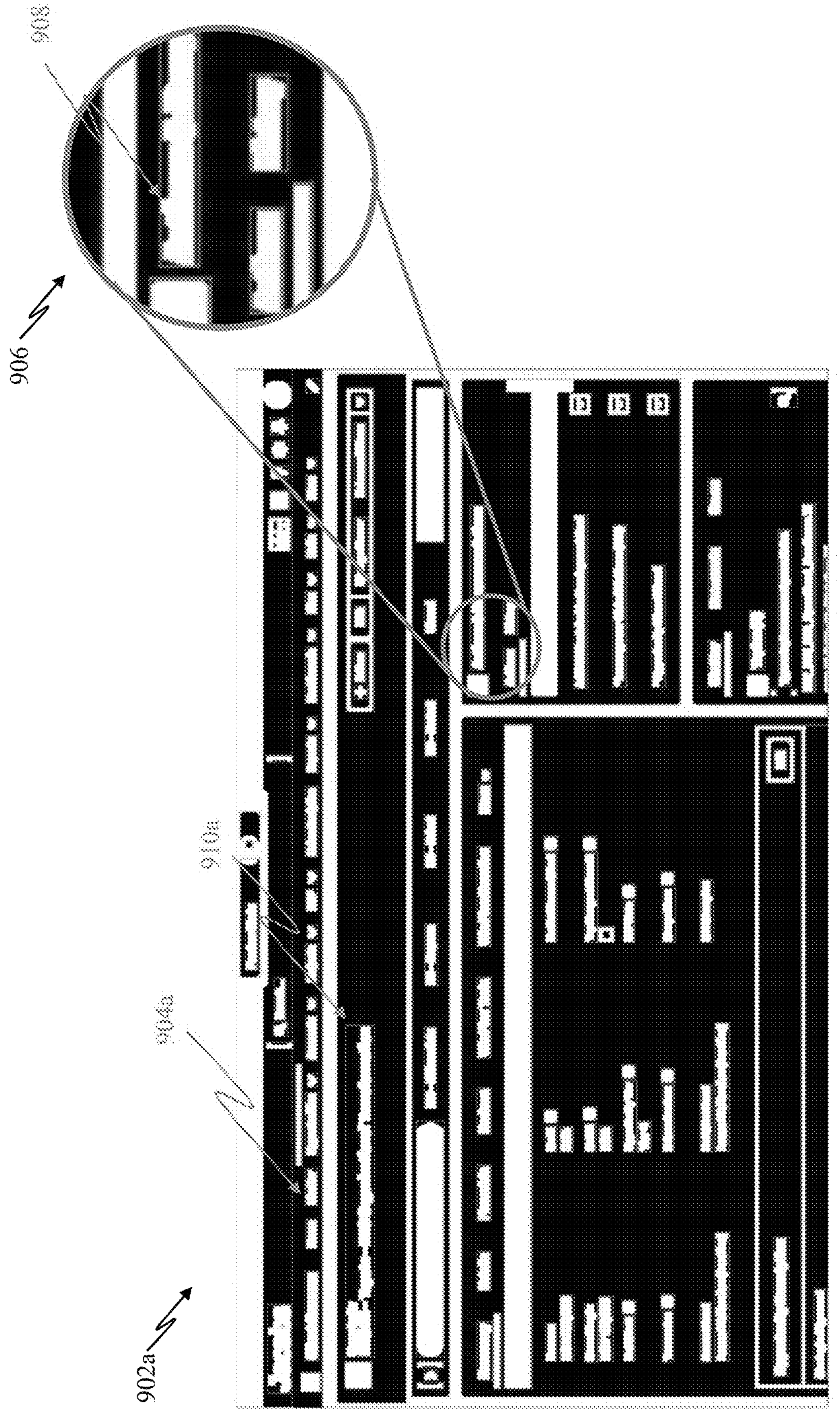
FIG. 9A depicts a first box image 902*a* derived from the first contoured image 802*a*, in accordance with an example embodiment.
Figure 9B:
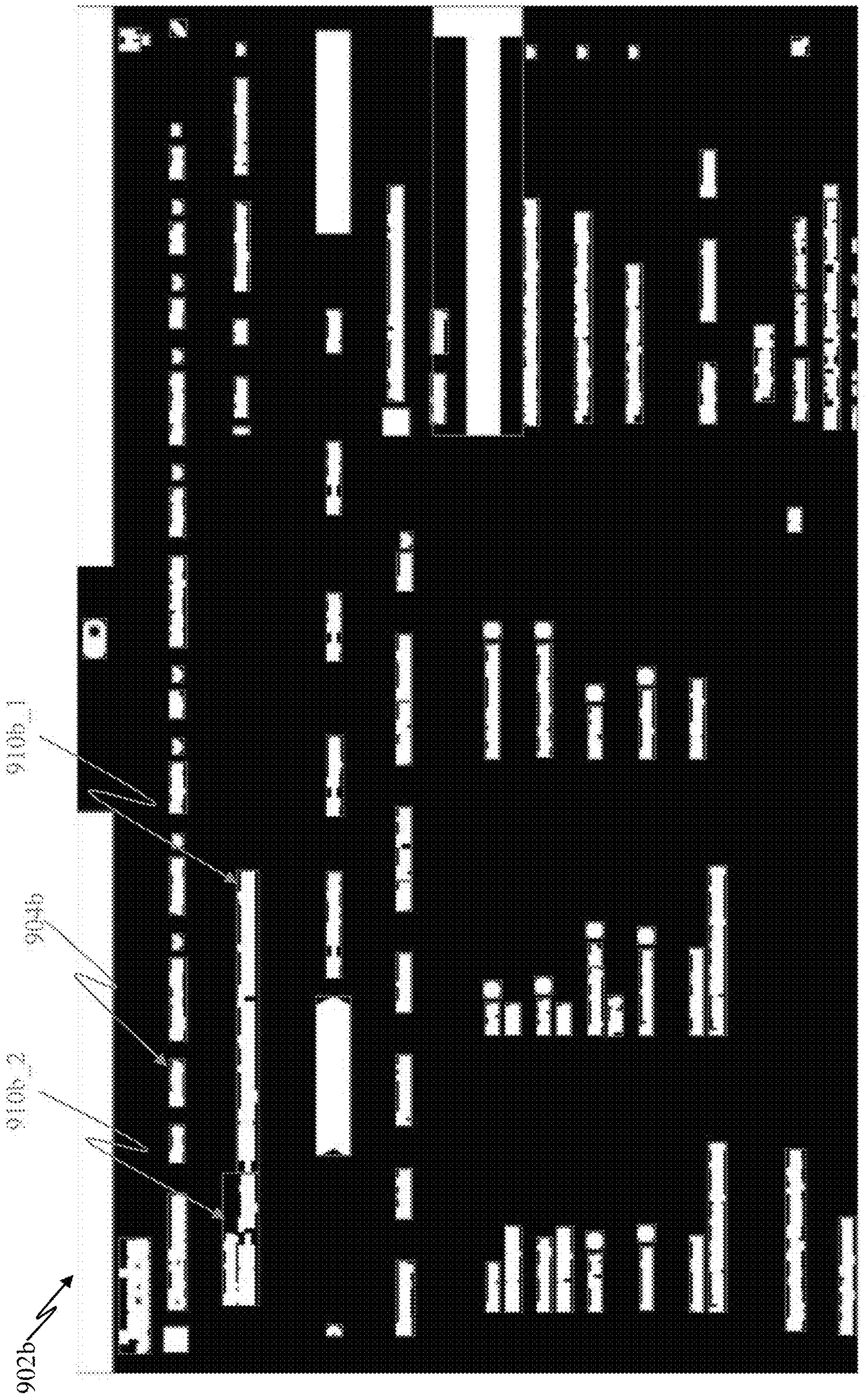
FIG. 9B depicts a second box image 902*b* derived from the second contoured image 802*b*, in accordance with an example embodiment.
Figure 9C:
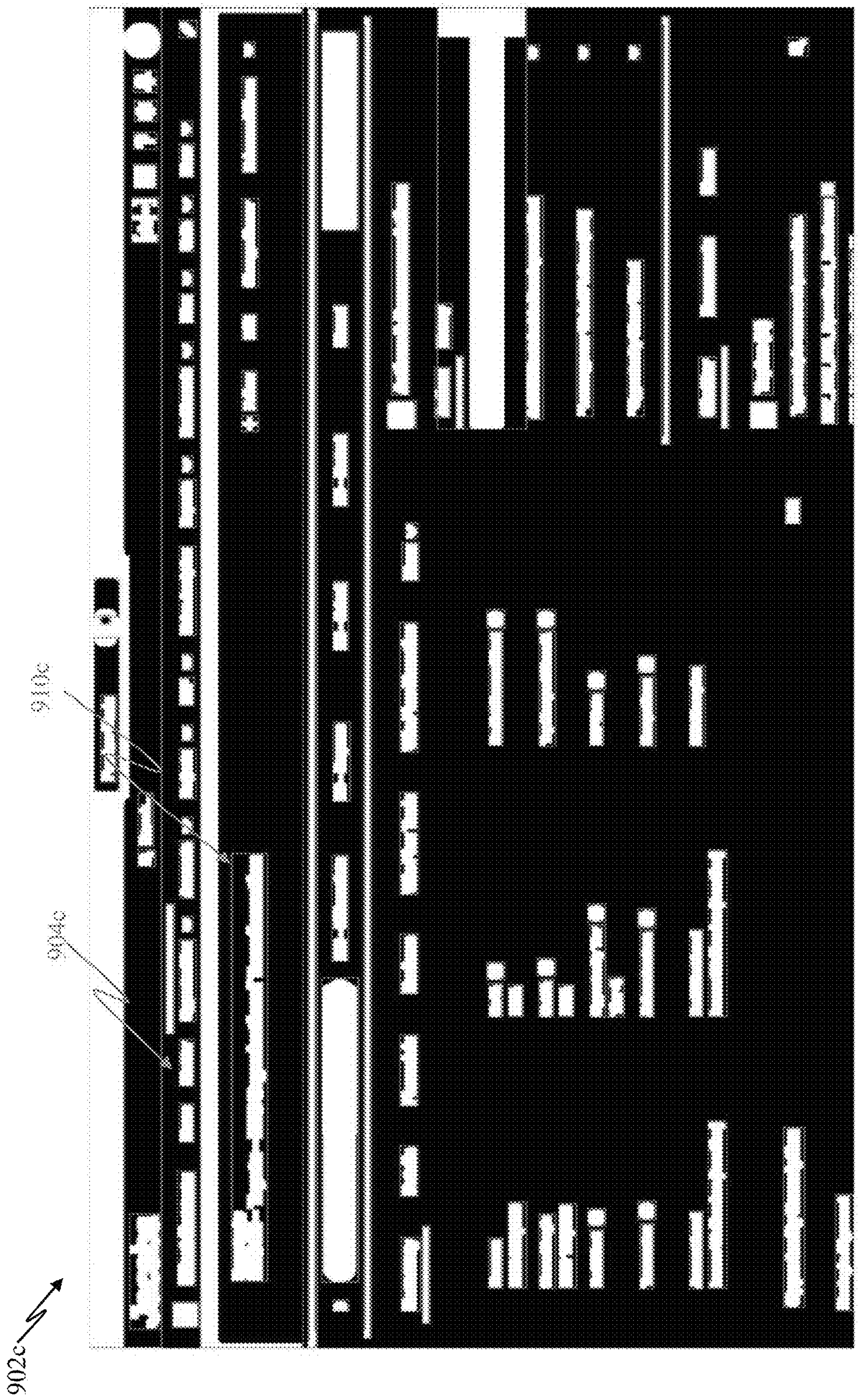
FIG. 9C depicts a third box image 902*c* derived from the third contoured image 802*c*, in accordance with an example embodiment.

Referring to step 116, the data processing system may further be configured to create bounding boxes around each of the blobs with contours present in the first contoured image 802_a_, the second contoured image 802_b_, and the third contoured image 802_c_, to obtain three images with bounding boxes, corresponding to the three contoured images. FIG. 9A depicts a first box image 902_a_ with a bounding box 904_a_, wherein the first box image 902_a_ is the first contoured image 802_a_ with bounding boxes created around each of the blobs with contours, similar to bounding box 904_a_. Further, FIG. 9A depicts an exploded section 906 comprising of a bounding box 908 (represented in green color) formed around a blob with contour present in the first contoured image 802_a_. FIG. 9B depicts a second box image 902_b_ with a bounding box 904_b_, wherein the second box image 902_b_ is the second contoured image 802_b_ with bounding boxes around each of the blobs with contours present in the second contoured image 802_b_. FIG. 9C depicts a third box image 902_c_ with a bounding box 904_c_, wherein the third box image 902_c_ is the third contoured image 802_c_ with bounding boxes around each of the blobs with contours present in the third contoured image 802_c_.

In accordance with an embodiment, as shown in FIG. 9A, a bounding box 910_a_ may encapsulate a contour found in the first contoured image 802_a_. Further, as shown in FIG. 9C, a bounding box 910_c_ may encapsulate a contour found in the third contoured image 802_c_. However, similar contour may not be formed in the second contoured image 802_b_. Further, as shown in FIG. 9B, bounding boxes 910_b__1 and 910_b__2 may encapsulate two contours found in the second contoured image 802_b_. However, the same contour may be detected in a different manner in the first contoured image 802_a_ and the third contoured image 802_c_.

Figure 10:
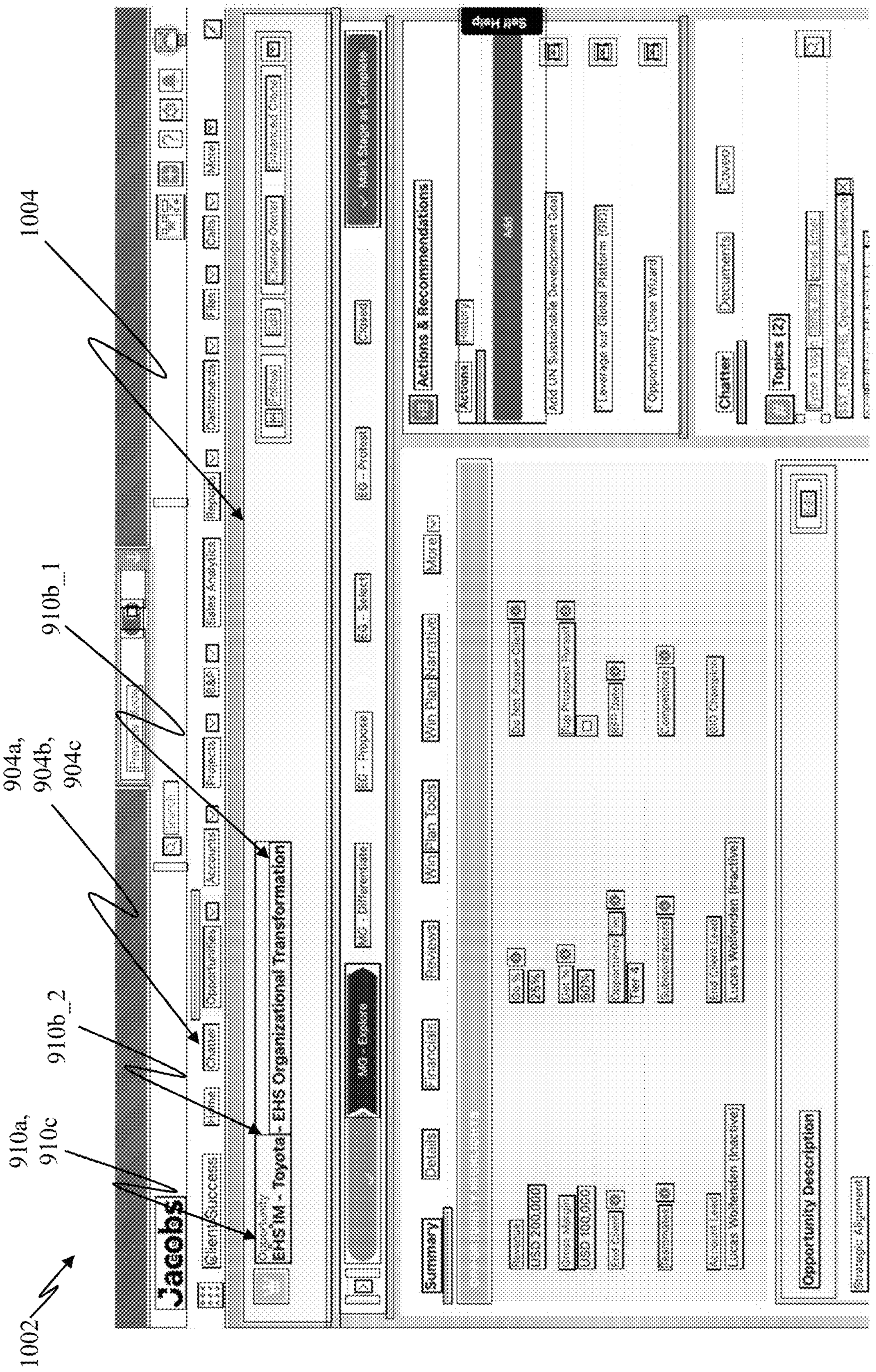
FIG. 10 depicts a collated image 1002 with bounding boxes collated from the first box image 902*a*, the second box image 902*b* and the third box image 902*c*, in accordance with an example embodiment.

Referring to step 118, the data processing system may further be configured to collate all the bounding boxes present in the first box image 902_a_, the second box image 902_b_, and the third box image 902_c_. FIG. 10 depicts a collated image 1002 with bounding boxes 904_a_, 904_b_, and 904_c_ corresponding to the first box image 902_a_, the second box image 902_b_, and the third box image 902_c_, respectively. It is to be noted that bounding boxes 902_a_, 902_b_, and 902_c_ are represented as an example. Each of the bounding boxes from the first box image 902_a_, the second box image 902_b_, and the third box image 902_c_ are collated in the collated image 1002. Further, the data processing system may be configured to obtain coordinates of each vertex of each of the bounding boxes.

In an embodiment, the bounding boxes 910_a_, 910_b__1, 910_b__2, and 910_c_ may be collated in the collated image 1002.

In an embodiment, the data processing system may be configured to create a list comprising of each of the bounding box from each of the box images 902_a_, 902_b_, and 902_c_, along with the coordinates of each vertex of each of the bounding boxes.

Figure 11:
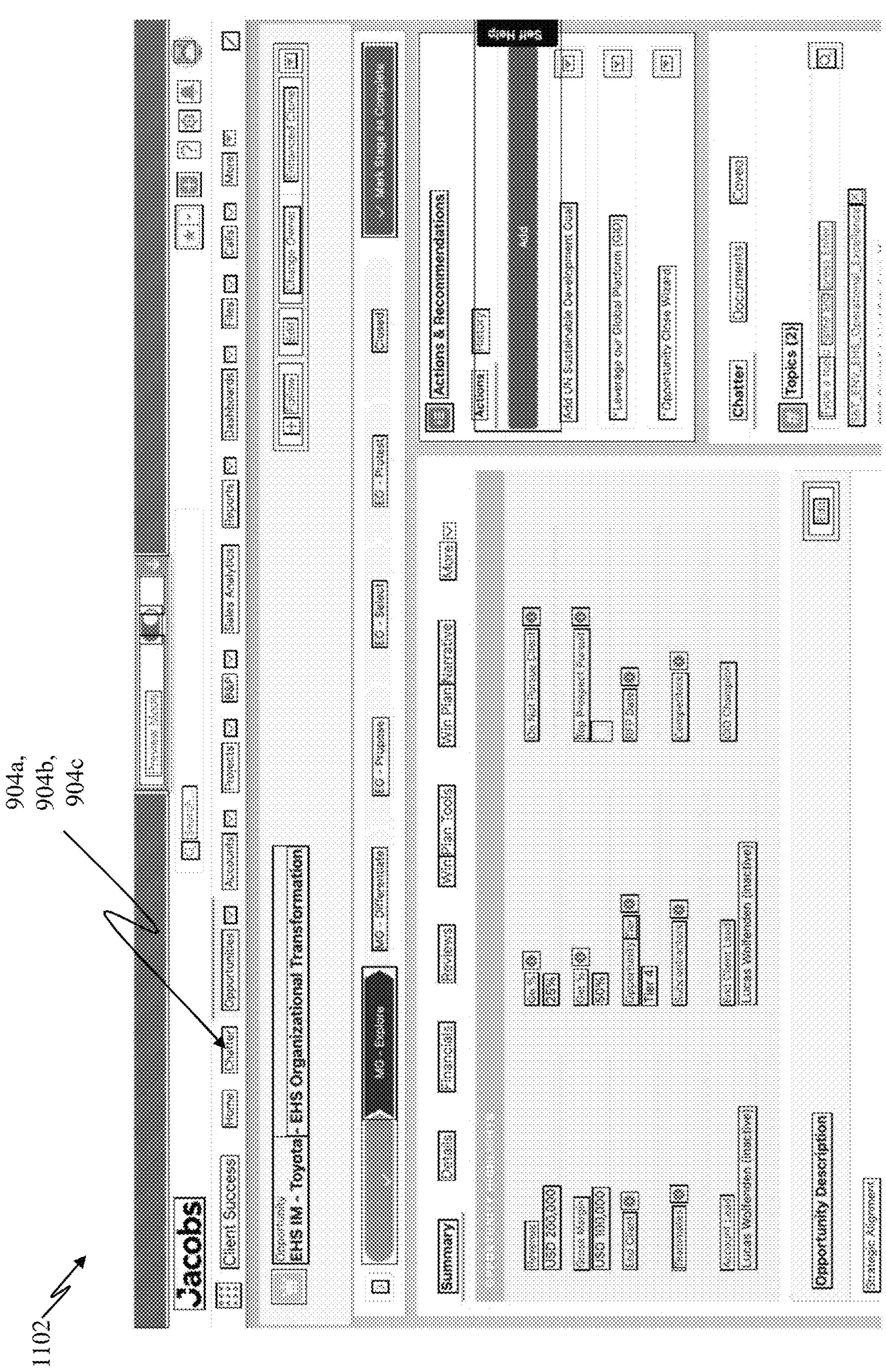
FIG. 11 depicts a dimension filtered image 1102, in accordance with an example embodiment.

Referring to step 120, the data processing system may further be configured to verify dimensions of each of the bounding boxes in the collated image 1002 with respect to the grayscale image 302. Further, the data processing system may delete any bounding boxes that fall outside the predetermined range. The range may be defined with respect to one or more of length and width of the bounding box, relative to the dimension of the digital UI image 202. As an example, the data processing system may be configured to ignore/delete a bounding box with dimension greater than 50% with respect to the dimension of the grayscale image 302. Further, the data processing system may be configured to delete a bounding box with dimension smaller than 5% with respect to the dimension of the grayscale image 302. FIG. 11 depicts a dimension filtered image 1102, wherein bounding box 1004 (refer FIG. 10) may be deleted by the data processing system, as a length of the bounding box 1004 is greater than 50% length of the grayscale image 302.

Figure 12:
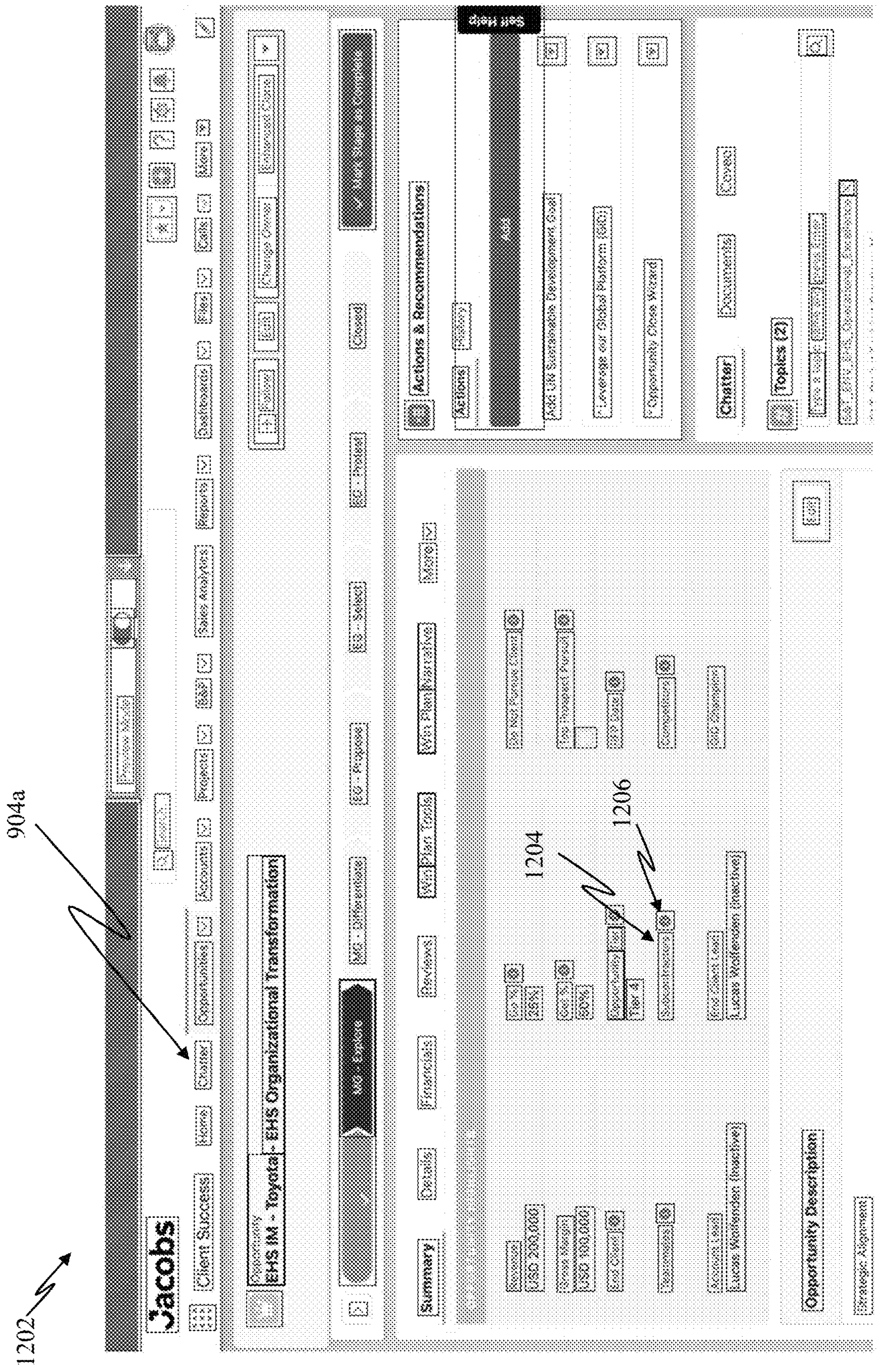
FIG. 12 depicts a duplicate filtered image 1202, in accordance with an example embodiment.

Referring to step 122, the data processing system may be configured to verify if there are any duplicate bounding boxes that are in a predefined proximity in the dimension filtered image 1102 to generate a duplicate filtered image 1202, as depicted in FIG. 12. As depicted in FIG. 12, bounding boxes 904_b_ and 904_c_ are deleted by the data processing system to avoid duplication of the bounding box 904_a_.

In an embodiment, the data processing system may be configured to generate duplicate filtered image 1202, wherein if there are any duplicates, the data processing system may delete the bounding boxes collated from the second box image 902_b_ and the third box image 902_c_, while retaining the bounding boxes obtained from the first box image 902_a_.

In an embodiment, the data processing system may be configured to generate duplicate filtered image 1202, wherein if there are any duplicates, the data processing system may create a new bounding box along the extreme vertices of all three bounding boxes 904_a_, 904_b_, and 904_c_.

In an embodiment, one of the bounding boxes among the bounding boxes 910_a_ and 910_c_ may be deleted.

Figure 13:
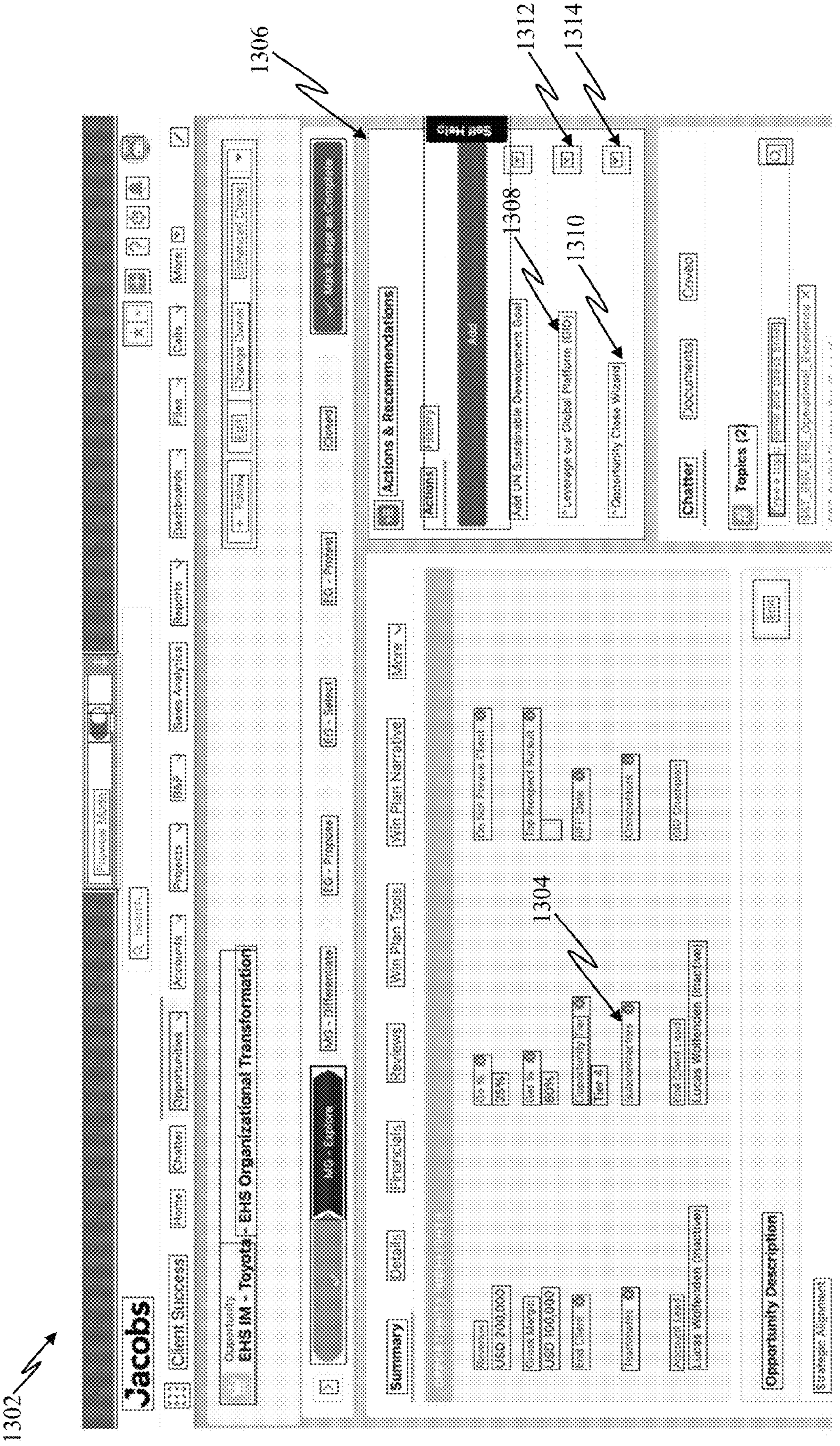
FIG. 13 depicts a proximity merged image 1302, in accordance with an example embodiment.

Referring to step 124, the data processing system may be configured to verify if there are bounding boxes that are in predefined proximity to each other in the duplicate filtered image 1202. Further, the data processing system may merge the bounding boxes that are close to each other. FIG. 13 depicts a proximity merged image 1302, wherein the bounding boxes 1204 and 1206 (depicted in FIG. 12) close to each other, wherein their proximity is within the predefined proximity, are merged by the data processing system to form bounding box 1304. In an embodiment, the proximity may be checked in first direction, such as a horizontal direction. Further, in an embodiment, the predefined proximity may be different for horizontal and vertical direction.

Referring to step 126, the data processing system may be configured to verify if there are any bounding boxes enclosing a predefined number of bounding boxes within them in the proximity merged image 1302. Further, the data processing system may delete the bounding boxes that are enclosing the predefined number of bounding boxes.

Figure 14:
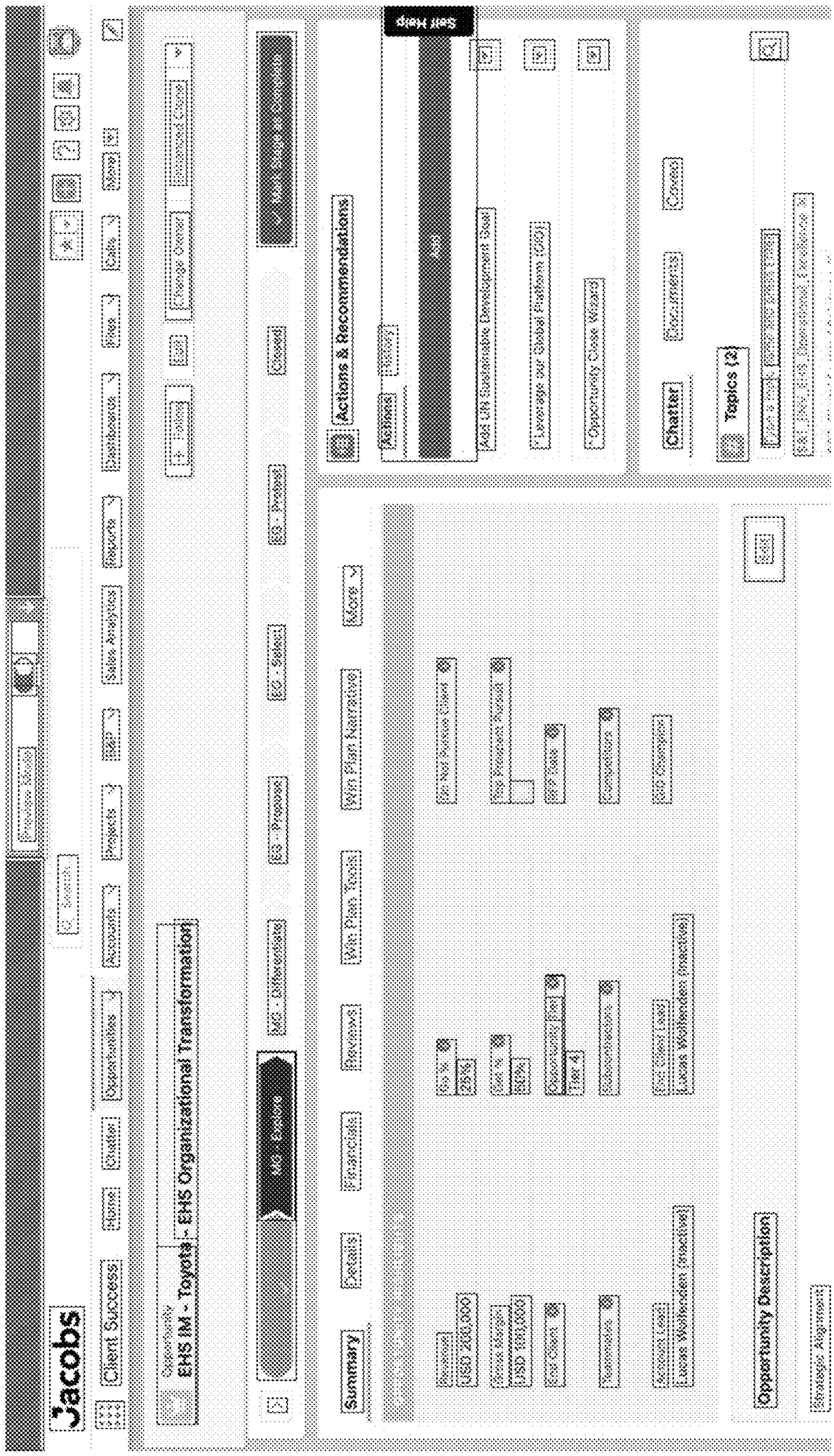
FIG. 14 depicts a nesting filtered image 1402, in accordance with an example embodiment.

In the example embodiment, the data processing system may be configured to verify if there are any bounding boxes enclosing three or more bounding boxes within them in the proximity merged image 1302. FIG. 14 depicts a nesting filtered image 1402, wherein the bounding box 1306 enclosing bounding boxes 1308, 1310, 1312, and 1314 (refer FIG. 13) may be deleted by the data processing system.

Referring to step 128, the data processing system may associate the remaining bounding boxes (associated with respective potential elements of interest) of the nesting filtered image 1402 to the digital UI image 202.

In an embodiment, the data processing system may be configured to store the digital UI image 202 along with information pertaining to each of the bounding boxes associated with potential elements of interest.

Figure 15:
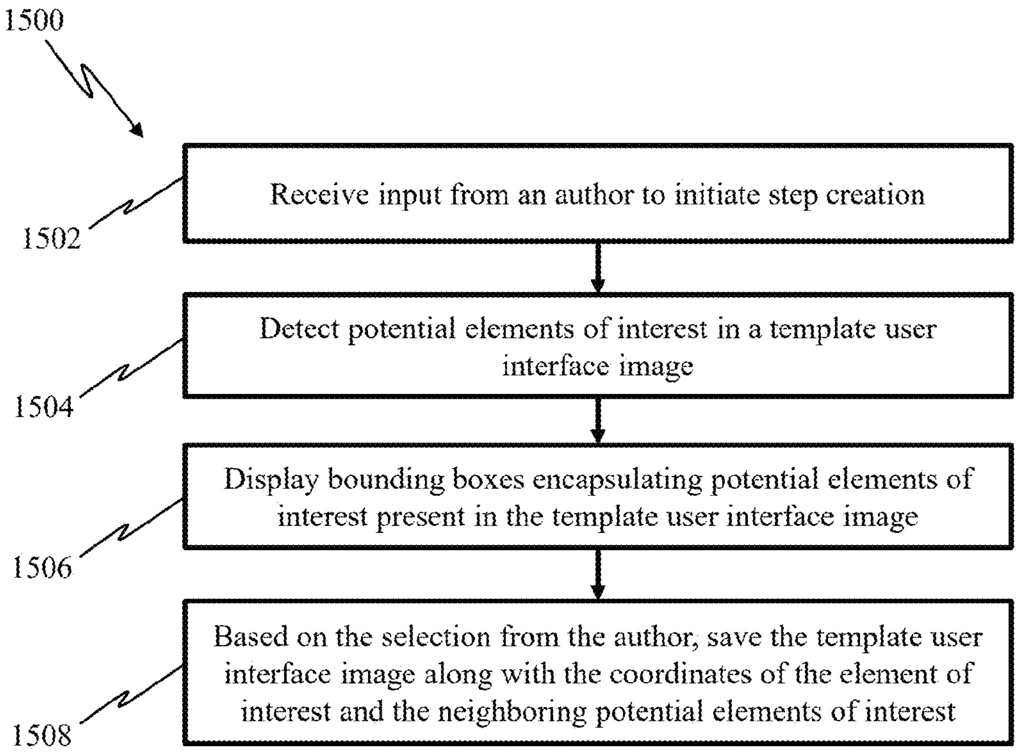
FIG. 15 illustrates a method 1500 for storing element of interest chosen by the author in a template UI image, in accordance with an example embodiment.

Moving on, we will now discuss a method 1500 of storing the element of interest chosen by the author in a template User Interface image (hereinafter template UI image) while referring to FIG. 15, in accordance with an embodiment. It is to be noted that the digital UI image 202 may be the template UI image.

As mentioned earlier, the data processing system may enable the author to create a step for the intended digital guidance to be displayed to the end user. As in step 1502, the data processing system may be configured to receive an input from the author to create a step to initiate setting up of the digital guidance.

In an embodiment, the data processing system may enable the author to create a step described in an earlier U.S. Pat. No. 11,461,090, content of which is herein incorporated in whole by reference.

The steps being relied upon are described herein briefly for easier understanding of the current method being described. The author may launch an editor, wherein a window with three buttons labelled Flow, Smart Tips and Beacons may be displayed. The author may select the Flow button to launch a window to create a step for the intended digital guidance, to be played to the end user. Upon selecting '+step' button, the data processing system may allow the author to select the element of interest for which the digital guidance is to be created.

At step 1504, the data processing system may process the template UI image to detect all potential elements of interest present in the template UI image. The processing of the template UI image may be performed in accordance with the method 100 described above in detail with reference to FIGS. 1-14.

At step 1506, the template UI image with bounding boxes encapsulating potential elements of interest may be displayed to the author. At step 1508, based on the selection received from the author, the data processing system may be configured to save the template UI image along with coordinates of the bounding box encapsulating the element of interest 1604 (referring to FIG. 16) and the coordinates of each of the bounding boxes encapsulating anchor elements 1606, 1608 (neighbouring potential elements of interest).

In an embodiment, the data processing system may be configured to identify presence of one or more anchor elements, among the potential element of interest, which are within a predefined vicinity of the bounding box encapsulating the element of interest 1604.

Figure 16:
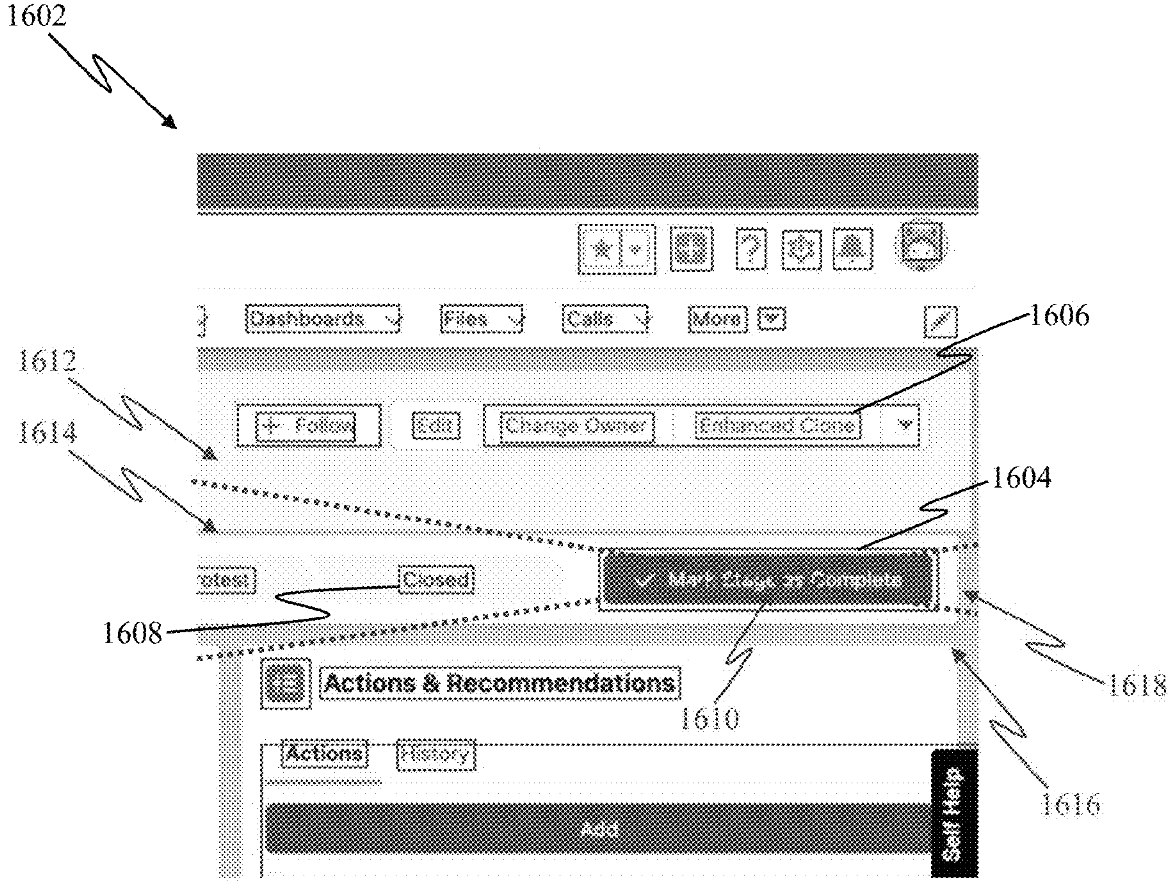
FIG. 16 depicts a zoomed in image 1602 of the nesting filtered image 1402 comprising an element of interest 1604, in accordance with an example embodiment.

FIG. 16 depicts a zoomed in image 1602 of the nesting filtered image 1402 comprising the element of interest 1604, along with a first anchor element 1606, and a second anchor element 1608. It is to be noted that other anchor elements may be identified in the nesting filtered image 1402.

In an embodiment, the data processing system may be configured to, upon receiving the input selecting the element of interest 1604, locate at least one anchor element in a first direction from a centre 1610 of the bounding box encapsulating the element of interest 1604. The data processing system may record the coordinates associated with the bounding boxes encapsulating the at least one anchor element 1606, 1608. Further, a distance between a centre of the anchor element and the centre 1610 of the element of interest 1604 may be calculated and recorded. Further, relative position of each of the anchor elements 1606, 1608 and the element of interest 1604 may be recorded and used later on.

In an embodiment, the data processing system may be configured to, upon receiving the input selecting the element of interest 1604, locate anchor elements in four quadrants, namely, a top quadrant 1612, a left quadrant 1614, a bottom quadrant 1616, and a right quadrant 1618, formed from the centre 1610 of the bounding box encapsulating the element of interest 1604.

In an embodiment, the data processing system may record the properties of the bounding box encapsulating the element of interest 1604, which may include, but not limited to, the background colour, coordinates of the bounding box encapsulating the element of interest 1604, monitor information such as, scale factor, and resolution of the image when captured. An example of the data recorded is provided below.

```
"element_properties": {
  "background": 0/1,
  "bounding_box": {
    "x0": 1012,
    "y0": 389,
    "x1": 985,
    "y1": 452,
  },
  "monitor_information": {
    "scaleFactor": 1.25,
    "resolutionX": 1920,
    "resolution Y": 1080
  }
}
```

The data processing system may further record the coordinates of the bounding boxes, the distance and relative direction of the anchor elements 1606, 1608 from the centre 1610 of the bounding box encapsulating the element of interest 1604, wherein plurality of distances may be calculated based on the coordinates of centres of each of the anchor elements 1606, 1608. An example of the data recorded is provided below.

```
"anchors": [{
  "bounding_box": {
    "x0": 715,
    "y0": 350,
    "x1": 556,
    "y1": 453,
  },
  "direction": "t",
  "distance": 200
},
{
  "bounding_box": {
    "x0": 455,
    "y0": 780,
    "x1": 126,
    "y1": 233,
  },
  "direction": "1",
  "distance": 110
}]
```

In the foregoing description the method of creating digital guidance to facilitate adoption of a software product was discussed. The above discussed method may be repeated across multiple UIs of the software product to create digital guidance for the software product. We've talked about how to create digital guidance. Next, we'll look at ways to show this guidance to users who want to learn about or use the software for which the guidance was made.

Figure 18:
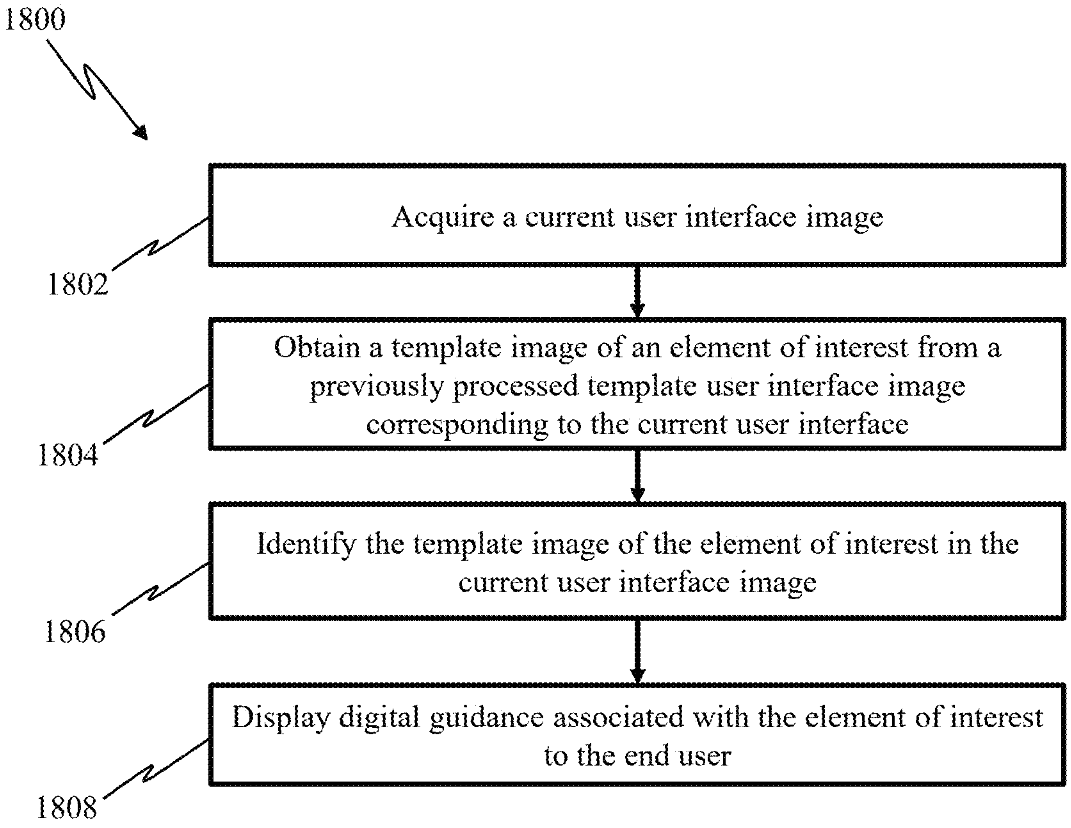
FIG. 18 depicts a method 1800 enabling playback of the digital guidance, created by the author, to the end user, in accordance with an embodiment.

FIG. 18 depicts a method 1800 enabling playback of the digital guidance, created by the author, to the end user, in accordance with an embodiment. The end user may be allowed to access the software application from a data processing system associated to the end user. The data processing system associated with the end user may have similar architecture as of the data processing system associated with the author, and hence referred to as data processing system itself to maintain simplicity. An example architecture of the data processing systems associated with the author and the end user are explained later in detail.

Figure 19:
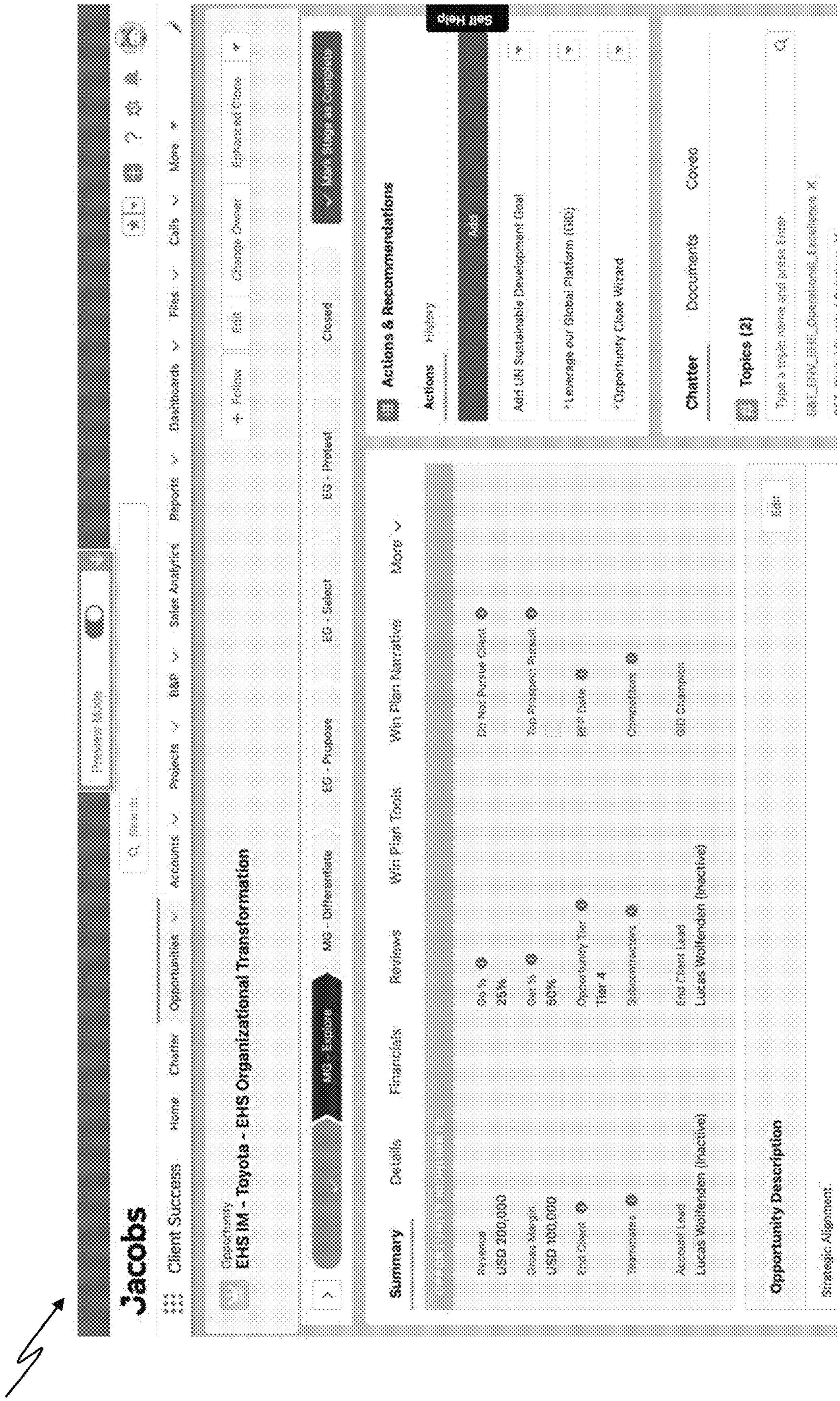
FIG. 19 depicts a current UI image 1902, in accordance with an embodiment.

At step 1802, the data processing system, upon allowing the end user to access the software application, may acquire a current User Interface image 1902 (hereinafter current UI image). FIG. 19 depicts the current UI image 1902, in accordance with an example embodiment.

In an embodiment, the data processing system may capture the user interface being displayed to the end user. The current UI image 1902 may be an image of the user interface being displayed to the end user.

As described in detail in the patent referred earlier, a unique link (or a unique ID) may be associated with every page/class associated with the webpage/software application, being accessed by the end user. Each of the unique links may be associated with plurality of template UI images captured during creation of digital guidance. The phrase Unique link is not necessarily limited to a URL, instead it may mean a unique attribute or a unique process path as well.

Figure 17:
FIG. 17 depicts a template image 1702 associated with the element of interest 1604, in accordance with an example embodiment.

In an embodiment, when the end user accesses the software application i.e., the unique attribute associated with the software application, the data processing system, at step 1804, may obtain a template image 1702, from the template UI image associated with the unique attribute. The template image 1702 may comprise of the element of interest 1604 for which the author had created a step during creation of digital guidance. FIG. 17 depicts the template image 1702 associated with the element of interest 1604, in accordance with an embodiment.

In an embodiment, the data processing system may transmit the unique attribute associated with the software application to a server, wherein the server may retrieve the template UI image associated with the unique attribute and transmit back to the data processing system. The server may further transmit the coordinates associated with the bounding boxes encapsulating the element of interest 1604 as well as the anchor elements 1606, 1608.

In an embodiment, the server may be configured to obtain the template image 1702 from the template UI image associated with the unique attribute.

In an embodiment, obtaining the template image 1702 may comprise of retrieving the saved coordinates of the bounding box encapsulating the element of interest 1604 along with the coordinates of the bounding boxes encapsulating each of the anchor elements 1606, 1608.

In an embodiment, obtaining the template image 1702 may comprise of cropping the image of the element of interest 1604 from the previously processed template UI image along the bounding box encapsulating the element of interest 1604.

At step 1806, the data processing system may be configured to identify the template image 1702 of the element of interest 1604 in the current UI image 1902. The steps of identifying the template image 1702 in the current UI image 1902 are explained later in detail.

At step 1808, the digital guidance 2004 associated with the element of interest 1604, if present in the current UI image 1902, may be displayed to the end user (refer FIG. 20) on the UI 2002.

Figure 21A:
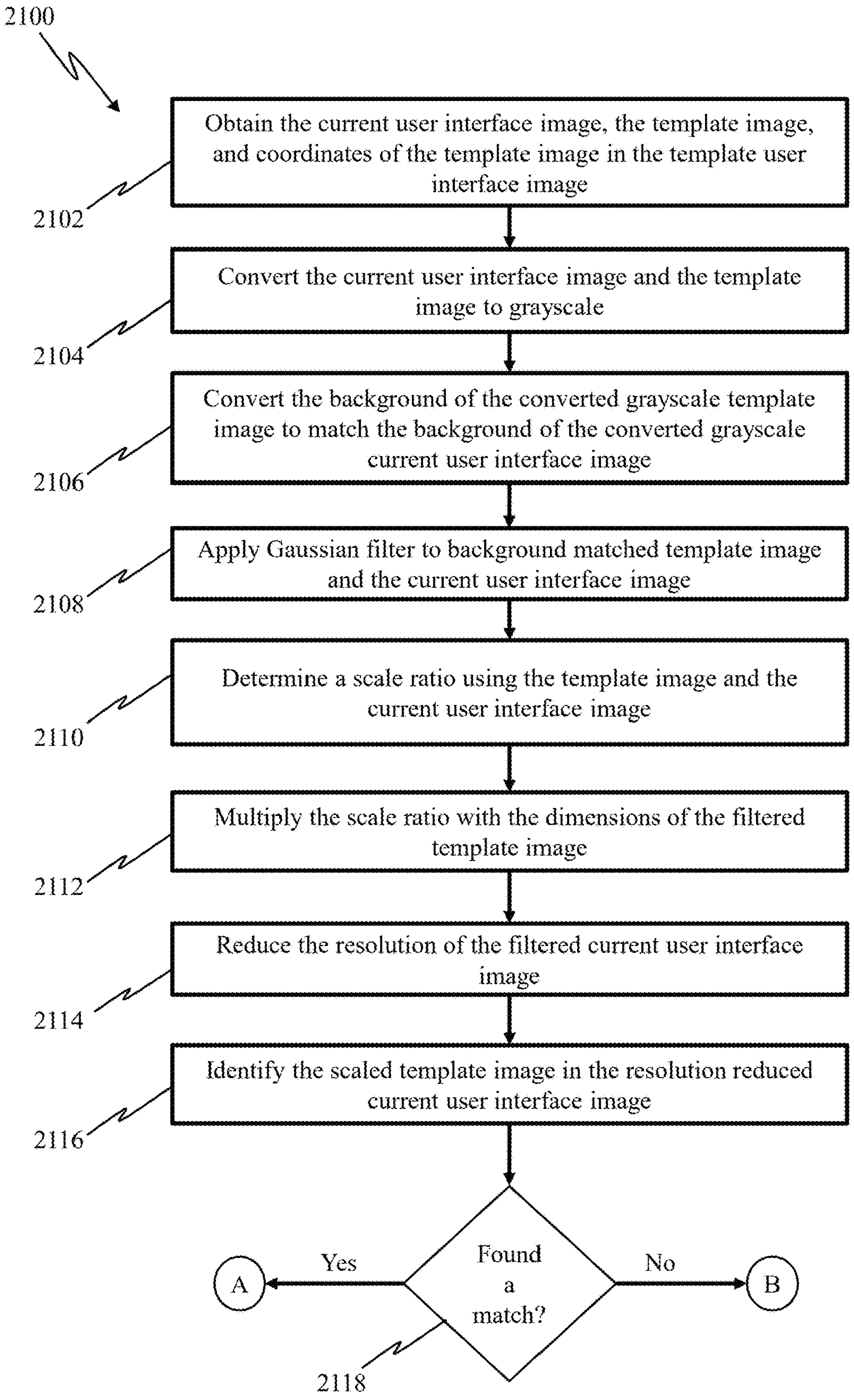
FIGS. 21A-B illustrate a method 2100 to identify the template image 1702 of the element of interest 1604 in the current UI image 1902, in accordance with an embodiment.
Figure 21B:
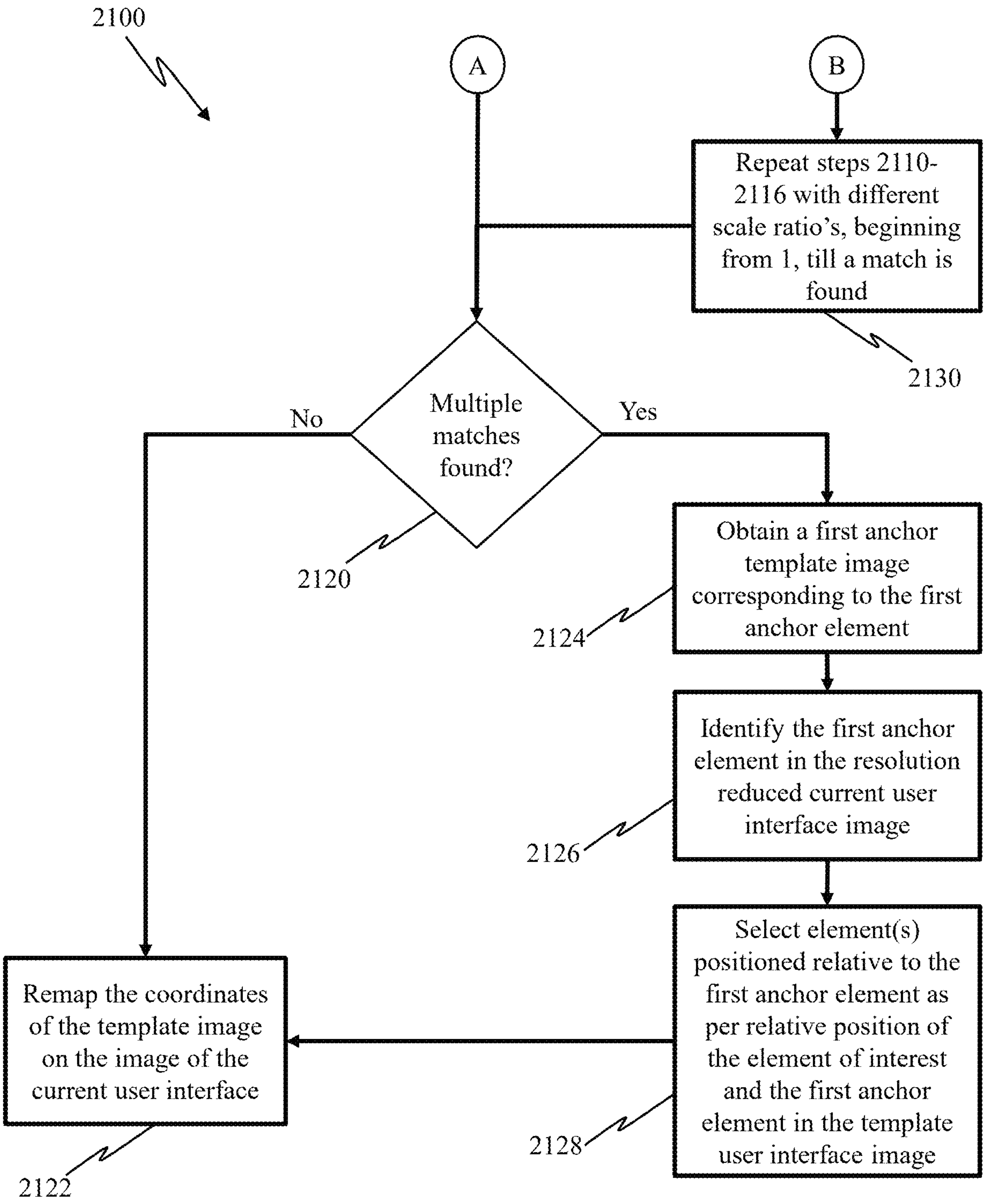

FIG. 21 illustrates a method 2100 to identify the template image 1702 of the element of interest 1604 in the current UI image 1902, in accordance with an embodiment. At step 2102, the data processing system may be configured to obtain the current UI image 1902, the template image 1702 and the coordinates of the template image 1702 in the template UI image.

In an embodiment, the template image 1702 of the element of interest 1604 may be derived from the template user interface image once the computing device, of an end user to whom the digital guidance is to be displayed, presents the software application for use to the end user.

Figure 22B:
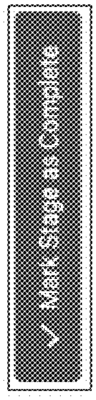
FIG. 22B depicts a converted grayscale image of template image 2202*b*, in accordance with an embodiment.
Figure 22A:
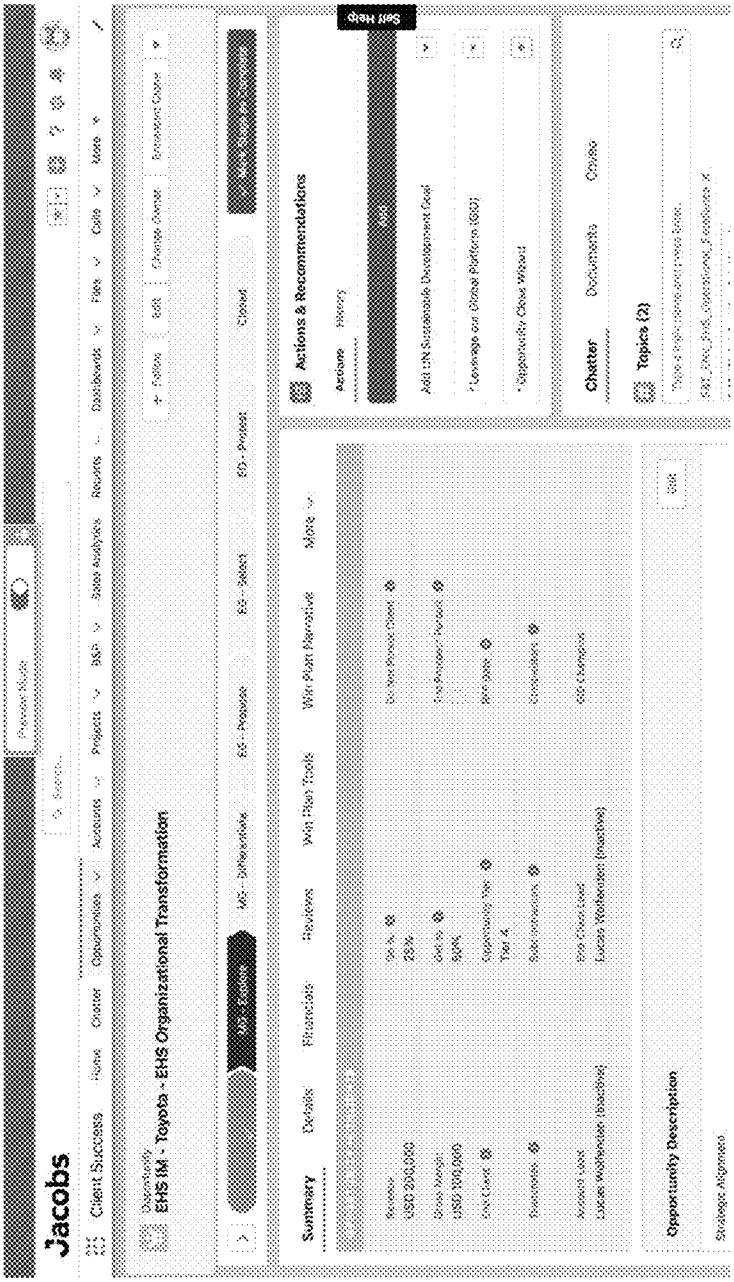
FIG. 22A depicts a converted grayscale image of current UI image 2202*a*, in accordance with an embodiment.

At step 2104, the current UI image 1902 and the template image 1702 may be converted to grayscale. FIG. 22A depicts the converted grayscale image of the current UI image 2202*a* and FIG. 22B depicts the converted grayscale image of the template image 2202*b*, in accordance with an embodiment. The conversion of the template image and the current UI image may be carried out similarly to the technique described previously.

In an embodiment, the background of the converted grayscale template image 2202*b* may be different from background of the converted grayscale current UI image 2202*a*. If any disparity between the backgrounds is detected, then at step 2106, the background of the converted grayscale template image 2202*b* may be converted to match the background of the converted grayscale current UI image 2202*a*.

In an embodiment, to detect a background mismatch, for an image with M×N Pixels, a maximum intensity, a minimum intensity, and mean intensity may be calculated, wherein the mean intensity is a mean value of the maximum intensity and the minimum intensity. Usually, the mean intensity value of M×N×127.5 may be considered. As an example, for an image with 600×400 Pixels, comprising of all-white pixels, the maximum intensity may be 600×400×255=61,200,000, whereas the mean intensity may be 600×400×127.5=30,600,000. Since the maximum intensity is greater than the mean intensity, the image may be considered to be having a white background. To further clarify, a sum of all the pixel values present in an image may be calculated. The sum may be compared to a theoretical maximum value of a purely white image (255× M×N). If the sum is less than half of the theoretical maximum, the image may be characterized as having a dark background, else light background.

In an embodiment, a function of OPENCV, bitwise_not, may be used to invert the background of the image, thereby converting the example image to an all-black background.

In some embodiments, any image pixel having a pixel value between 0 and x may be assigned a pixel value of 255, and a pixel value between y and 255 may be assigned a pixel value of 0, wherein x is an integer value between 0 and 127, inclusive, and y is an integer value between 128 and 255, inclusive.

Figure 23A:
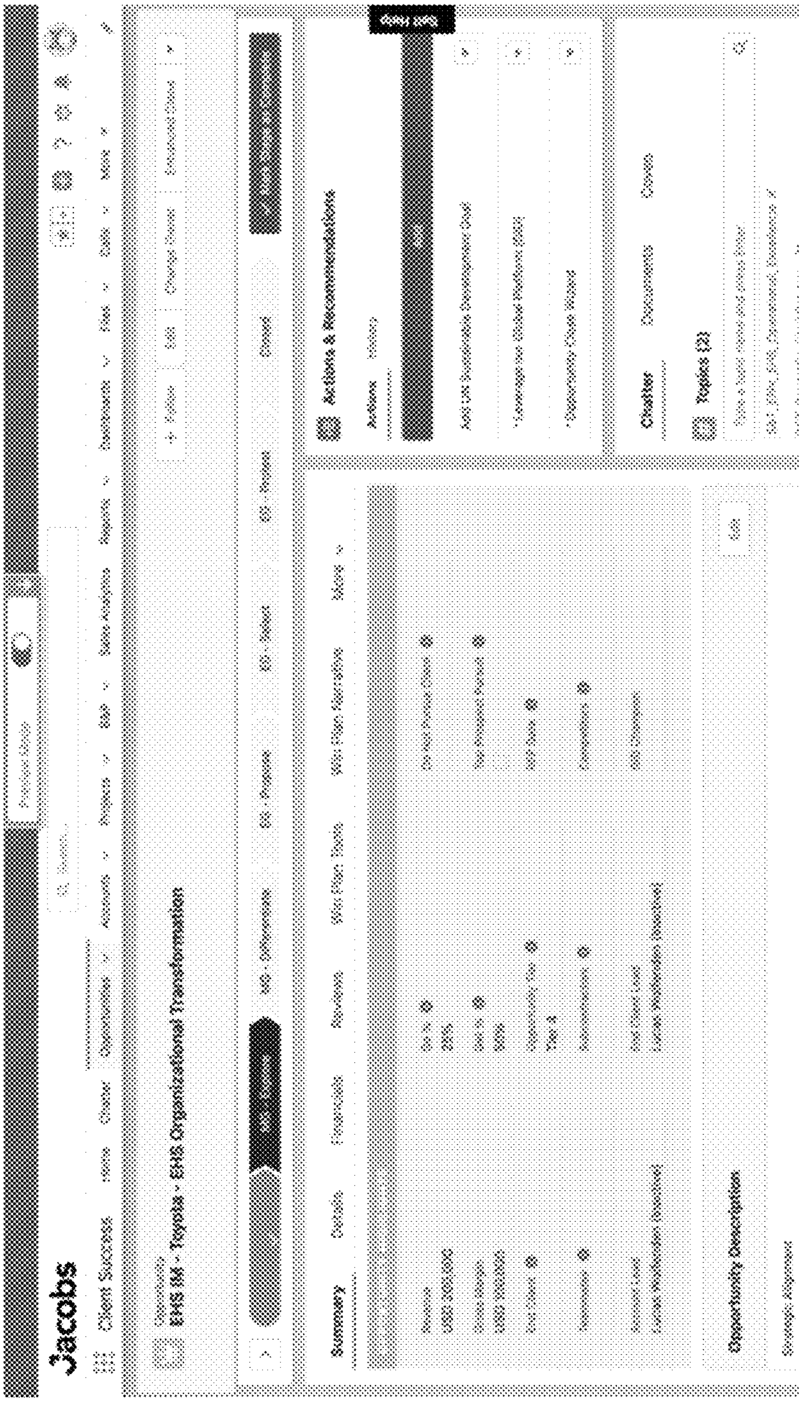
FIG. 23A depicts a filtered current UI image 2302*a*, in accordance with an embodiment.
Figure 23B:
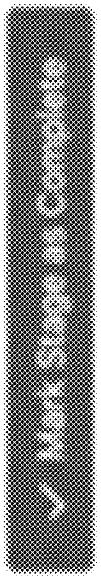
FIG. 23B depicts a filtered template image 2302*b*, in accordance with an embodiment.

At step 2108, a Gaussian Filter may be applied to the converted grayscale template image 2202*b* (or the background matched template image) and the current UI image 1902. FIG. 23A depicts the filtered current UI image 2302*a* and FIG. 23B depicts the filtered template image 2302*b*, in accordance with an embodiment.

At step 2110, the data processing system may be configured to determine a scale ratio using the template image 1702 and the current UI image 1902.

In an embodiment, the scale of the current UI image 1902 may be obtained from the data processing system. Further, the scale of the current UI image 1902 is divided by the scale of the template image 1702 to obtain the scale ratio.

In an embodiment, the scale ratio may be used as a starting point for template scaling, wherein the dimensions associated with the template image 1702 may be scaled up or down based on the scale ratio.

In accordance with an example, the scale of the current UI image 1902 may be 150% while the scale of the template image 1702 may be 100%. Thereby, the scale ratio of 1.5 (150/100) may be achieved. Furthermore, the scale ratio of 1.5 may be used as a starting point for template scaling.

At step 2112, for template scaling, the dimensions associated with the template image 1702 may be multiplied with the calculated scale ratio i.e., length and height associated with the filtered template image 2302*b* may be multiplied with the scale ratio to obtain a scaled template image.

In accordance with the example being described, the scale at which the current UI image 1902 and the template UI image may be same. Therefore, the filtered template image 2102B may be multiplied with the scale ratio of 1.

In accordance with another embodiment, the length and height associated with the filtered template image 2302*b* may be multiplied with the scale ratio of 1.5 to obtain the scaled template image.

Figure 24:
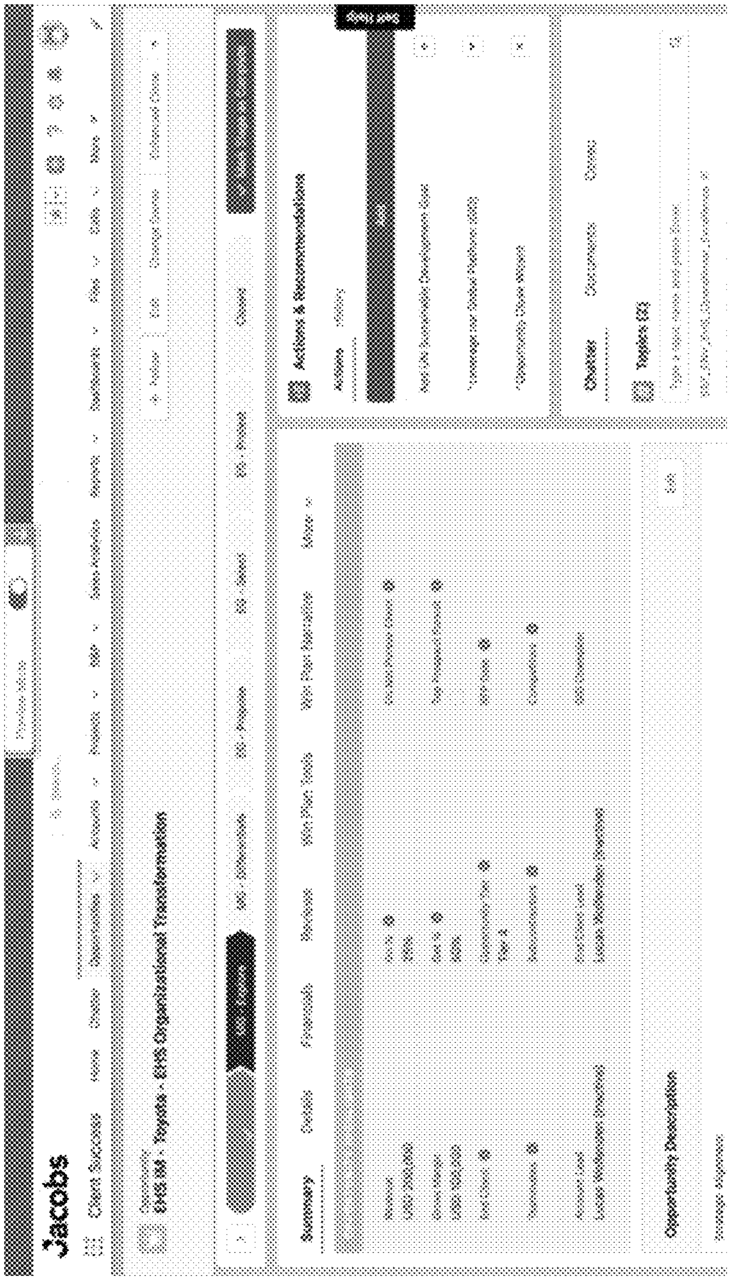
FIG. 24 depicts a resolution reduced current UI image 2402, in accordance with an example embodiment.

At step 2114, the resolution of the filtered current UI image 2302*a* may be reduced to obtain a resolution reduced current UI image 2402. FIG. 24 depicts the resolution reduced current UI image 2402, in accordance with an example embodiment. Reducing the resolution of the filtered current UI image 2302*a* may improve the efficiency of the operation by lowering the computational intensiveness required to match the template image and the current UI image. To further clarify, the number of instructions required to match the scaled template image with a resolution of 10×10 with the resolution reduced current UI image 2402 having a resolution of 600×400 would be less than as compared to matching with the filtered current UI image 2302*a* having a resolution of 1920×1080.

In the current example, resolution of the filtered current UI image 2302*a* may be 821×1440. The resolution reduced current UI image 2402 may have a resolution of 456×800 after reduction.

At step 2116, the data processing system may be configured to identify the scaled template image in the resolution reduced current UI image 2402. A predefined confidence threshold may be used to confirm if the scaled template image is present in the resolution reduced current UI image 2402. The scaled template image may be considered to be present in the resolution reduced current UI image 2402, if a calculated confidence level surpasses the predefined confidence threshold.

In an embodiment, a Template Matching Algorithm, such as cv.matchtemplate( ) from the OPENCV, may be used.

At step 2118, if the data processing system finds a match, i.e., if the predefined confidence threshold is crossed, the data processing system at step 2120, may verify if multiple matches are found, i.e., multiple potential elements of interest are found in the resolution reduced current UI image 2402 that match with the element of interest present in the scaled template image.

At step 2122, if a single match is found, to remap the coordinates of the template image 1702, the coordinates of the template image 1702 may be multiplied with the scale factor. It may be noted that while bringing the resolution down of the current UI image 1902, the dimensions of the current UI image 1902 were reduced to W1*H1 from W*H. As an example, when the scaled template image is found at location x, y, the location may be remapped by following x1=x*(W/W1) and y1=y*(H/H1), where x1 and y1 represent the new location of the template image 1702 in the current UI image 1902.

Going back to step 2120, if multiple matches are found, at step 2124, the data processing system may obtain template images associated with the anchor elements from the template user interface image based on the coordinates of the bounding box encapsulating each of the anchor elements.

In an embodiment, the template images of the anchor elements may be processed at each step described above in 2100-2120 along with the template image 1702.

Figure 25:
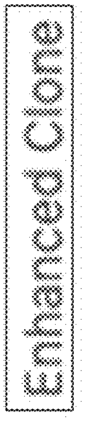
FIG. 25 depicts a first anchor template image 2502, in accordance with an example embodiment.

FIG. 25 depicts a first anchor template image 2502, in accordance with an example embodiment. The first anchor template image 2502 associated with the first anchor element 1606 may be obtained, wherein the first anchor element 1606 may be closest to the element of interest 1604 among the anchor elements 1606, 1608.

In an embodiment, the data processing system may be configured to select an anchor element present in the top quadrant 1612 before moving on to selecting other elements from the anchor elements, in a sequential manner, as required in the steps described later.

In an embodiment, each of the anchor elements may be sequentially used till one of the multiple matched elements is selectable as the element of interest, beyond the predefined confidence threshold.

In an embodiment, sequence of considering the anchor elements for selecting one among the multiple matched elements, may be in an ascending order of the anchor elements' vicinity to the element of interest in the template user interface image.

At step 2126, the first anchor template image 2502 may be identified in the resolution reduced current UI image 2402. The identification may be carried out in a similar manner described in connection with the template image.

At step 2128, upon identifying the first anchor element 1606 in the resolution reduced current UI image 2402, one of the multiple matched elements as the element of interest may be selected. The selected element may be positioned relative to the anchor element as per relative position of the element of interest and the anchor element in the template UI image.

In an embodiment, upon selecting the element of interest, step 2122 may be executed, wherein the coordinates of the template image 1702 may be multiplied with the scale factor to remap the coordinates of the template image 1702 in the current UI image 1902.

In an embodiment, if again multiple potential elements of interest are identified as the element of interest 1604, a second anchor template image associated with the second anchor element 1608 may be obtained and the steps of identifying may be repeated for the second anchor template image. Further, the element of interest may be narrowed down to select the element of interest 1604 from the multiple potential elements of interest identified.

At step 2130, if the template image 1702 is not found in the current UI image 1902, the data processing system may be configured to update the scale ratio to 1 and repeat the steps of identifying the template image 1702 in the resolution reduced current UI image 2402, as described above.

In an embodiment, the scale ratio may be incremented by a factor of 0.2 until the template image 1702 is identified in the resolution reduced current UI image 2402.

In an embodiment, the scale ratio may be incremented by a factor of 0.2 until the predefined confidence threshold is obtained for a particular scale ratio.

As an example, in the above-described example, if no match is identified for the template image 1702 in the current UI image 1902, the scale ratio may be updated to 1 and the remaining steps of multiplying the scale ratio of 1 with the dimensions of the template image 1702 and identifying the scaled template image in the resolution reduced current UI image 2402 may be executed. Further, if no match is identified, the scale ratio may be updated to 1.2 and the remaining steps may be repeated. This would go on till a match is found or the scale ratio reaches a value of 2.

In an embodiment, the data processing system may be configured to, upon identifying multiple matches for the element of interest 1604, identify each of the anchor elements 1606, 1608 in the current UI image 1902. Further, the element of interest 1604 may be identified and selected based on the identified element of interest from the multiple matches of elements of interest found.

Figure 20:
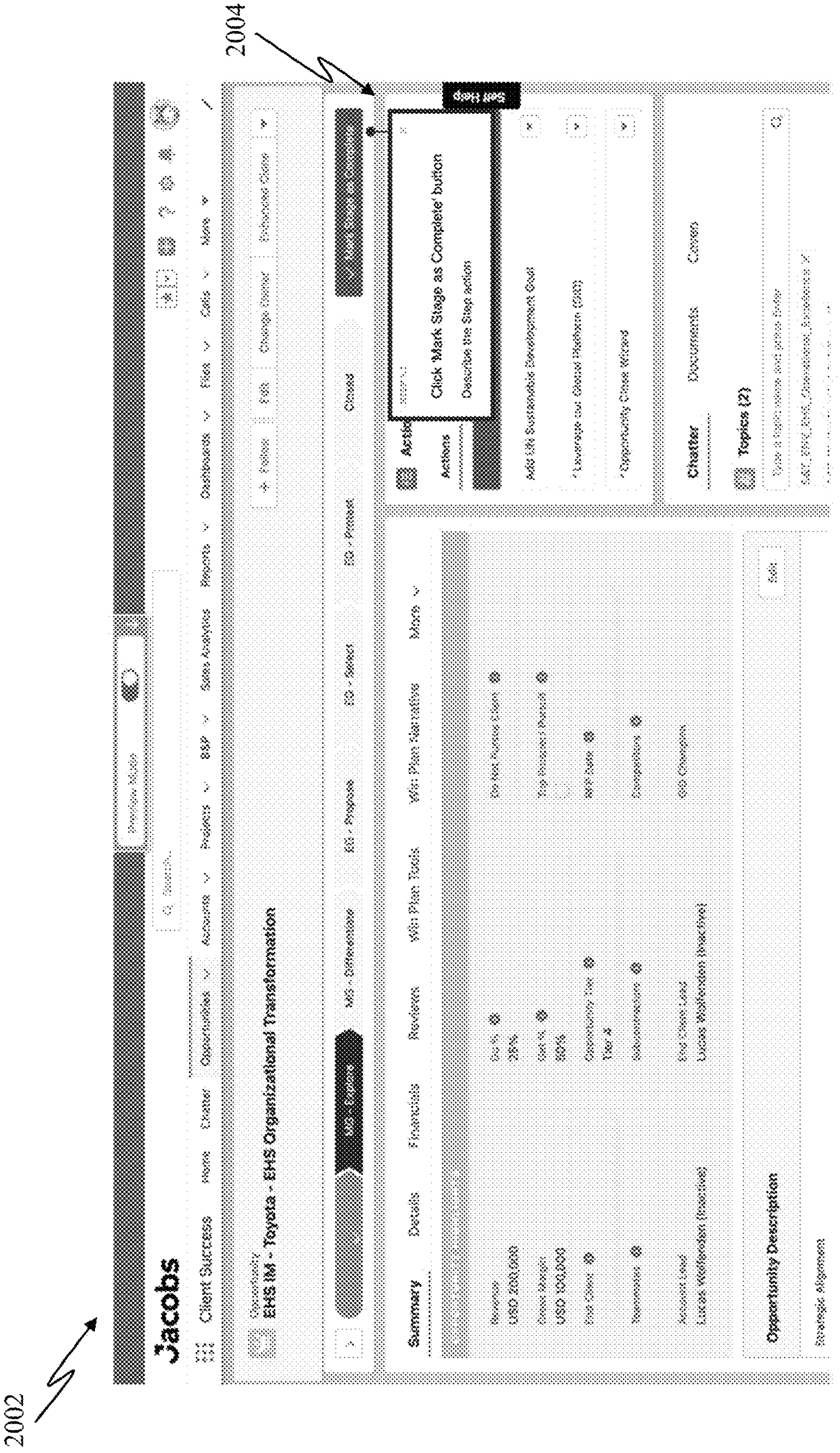
FIG. 20 depicts a step 2004 being displayed to an end user on a UI 2002, in accordance with an example embodiment.

Finally, the data processing system may be configured to display the step created as part of the digital guidance 2004 associated with the element of interest 1604 to the end user on the UI 2002, as shown in FIG. 20.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The methods described above may be implemented by a data processing system that performs the steps through executing instructions stored on a non-transitory computer-readable medium.

The example embodiments described herein may be implemented in an operating environment comprising software installed on a computer, in hardware, or in a combination of software and hardware.

Figure 26:
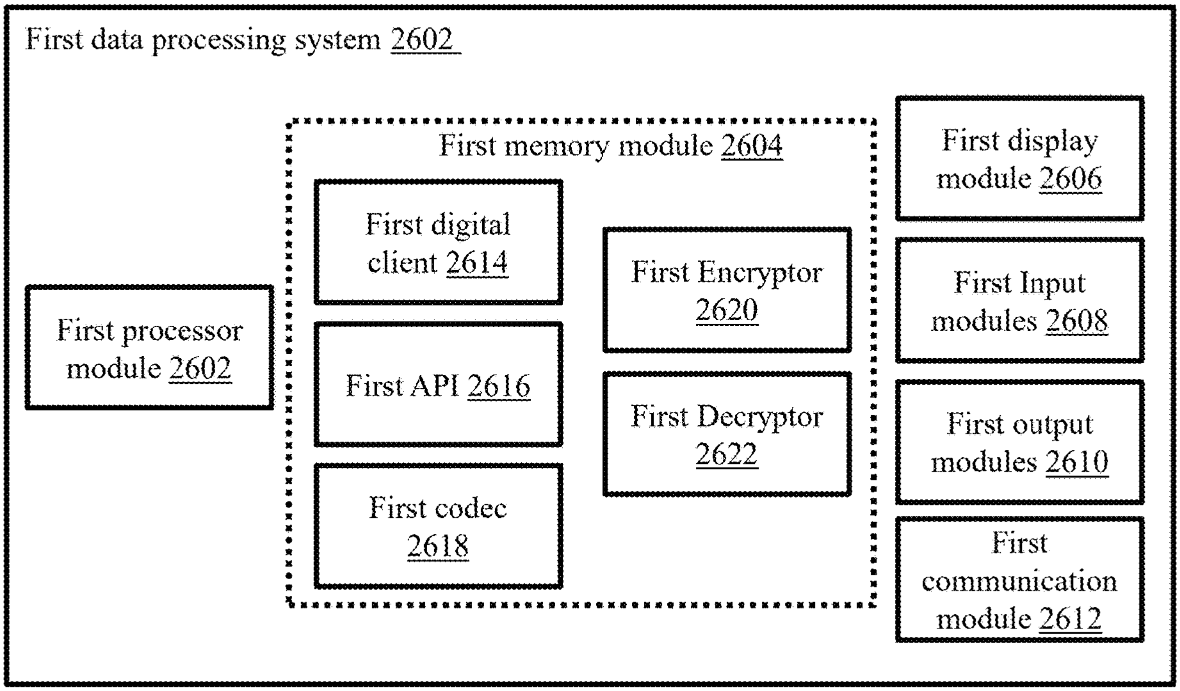
FIG. 26 is a block diagram illustrating a first data processing system 2602, in accordance with an embodiment.

Moving on, we now explain an example configuration of the data processing system associated with the author and end user. FIG. 26 is a block diagram illustrating a first data processing system 2602, in accordance with an embodiment. The first data processing system 2602 may comprise a first processor module 2602, a first memory module 2604, a first display module 2606, first input modules 2608, first output modules 2610 and a first communication module 2612.

The first processor module 2602 may be implemented in the form of one or more processors and may be implemented as appropriate in hardware, computer-executable instructions, firmware, or combinations thereof. Computer-executable instruction or firmware implementations of the first processor module 2602 may include computer-executable or machine-executable instructions written in any suitable programming language to perform the various functions described.

The first memory module 2604 may include a permanent memory such as hard disk drive, may be configured to store data, and executable program instructions that are implemented by the processor module. The first memory module 204 may be implemented in the form of a primary and a secondary memory. The first memory module 2604 may store additional data and program instructions that are loadable and executable on the first processor module 2602, as well as data generated during the execution of these programs. Further, the first memory module 2604 may be volatile memory, such as random-access memory and/or a disk drive, or non-volatile memory. The first memory module 2604 may comprise of removable memory such as a Compact Flash card, Memory Stick, Smart Media, Multimedia Card, Secure Digital memory, or any other memory storage that exists currently or may exist in the future.

In an embodiment, the first memory module 2604 may further comprise a first digital client 2614, a first Application Programming Interface (API) 2616, a first codec 2618, a first encryptor 2620 and a first decryptor 2262. The first digital client 2614 may be a web browser or a software application. The first codec 2618 may include computer-executable or machine-executable instructions written in any suitable programming language to perform compress outgoing data and decompress incoming data. The first encryptor 2620 may encrypt the data being sent and the first decryptor 2622 may decrypt the incoming data.

The first display module 2606 may display an image, a video, or data to a user. For example, the first display module 2606 may include a panel, and the panel may be an LCD, LED or an AM-OLED.

The first input modules 2608 may provide an interface for input devices such as keypad, touch screen, mouse and stylus among other input devices. In an embodiment, the input modules 2608 includes a camera and a microphone.

The first output modules 2610 may provide an interface for output devices such as display screen, speakers, printer and haptic feedback devices, among other output devices.

The first communication module 2612 may be used by the first data processing system 2602 to communicate with the server 2702. The first communication module 2612, as an example, may be a GPRS module, or other modules that enable wireless communication.

Figure 27:
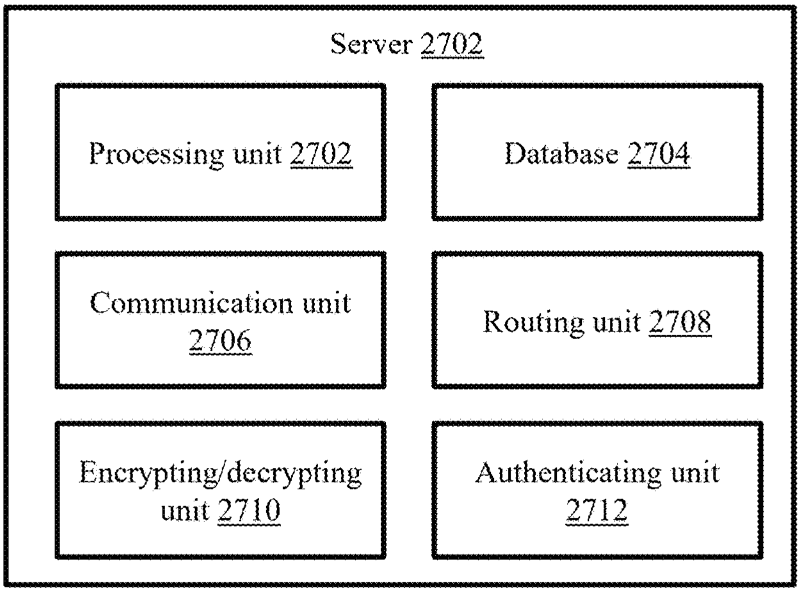
FIG. 27 is a block diagram illustrating a remote server 2702, in accordance with an embodiment.

Further, we now explain an example configuration of the server 2702 enabling the data processing systems to establish communication. FIG. 27 is a block diagram illustrating a server 2702, in accordance with an embodiment. The server 2702 may comprise a processing unit 2702, a memory unit 2704, a communication unit 2706, a routing unit 2708, an encrypting/decrypting unit and an authenticating unit 2712.

The processing unit 2702 may be implemented in the form of one or more processors and may be implemented as appropriate in hardware, computer-executable instructions, firmware, or combinations thereof. Computer-executable instruction or firmware implementations of the processing unit 2702 may include computer-executable or machine-executable instructions written in any suitable programming language to perform the various functions described.

The memory unit 2704 may include a permanent memory such as hard disk drive, may be configured to store data, and executable program instructions that are implemented by the processor module.

The communication unit 2706 may be used by the server 2702 to communicate with the first data processing system 2602. The communication unit 2706, as an example, may be a GPRS module, or other modules that enable wireless communication.

The routing unit 2708 may enable identification of data processing systems to which the data must be transmitted.

The encrypting/decrypting unit 2710 may encrypt the incoming data from the first data processing system 2602 and decrypt the outgoing data from the server 2702.

The authenticating unit 2712 may authenticate the first data processing system 2602 before establishing a connection.

The foregoing description refers to the various steps being carried out by a data processing system. Such a data processing system may be a stand-alone data processing system or a network of data processing system(s) and server.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

The detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

What is claimed is:

1. A method for providing digital guidance corresponding to software applications, wherein a data processing system comprising one or more processors is configured to execute the method of:

acquiring an image of a current user interface of a software application;

obtaining a template image of an element of interest from a previously processed template user interface image corresponding to the current user interface, wherein obtaining the template image of the element of interest comprises:

obtaining bounding boxes using a plurality of binary images of the template user interface, each of the bounding boxes encapsulating a respective one of a potential element of interest among elements present in the template user interface image; and receiving a selection of at least one of the bounding boxes, wherein the selected bounding box corresponds to the element of interest among the potential element of interest;

identifying the element of interest in the current user interface by using the template image of the element of interest and the image of the current user interface; and displaying digital guidance associated with the element of interest in the current user interface.

2. The method of claim 1, wherein obtaining the template image of the element of interest further comprises:

recording coordinates of the bounding box, in the template user interface image, encapsulating the element of interest; and obtaining the template image of the element of interest from the template user interface image based on the coordinates of the bounding box encapsulating the element of interest.

3. The method of claim 2, further comprising:

identifying presence of one or more anchor elements, among the potential element of interest, which are within a predefined vicinity of the bounding box encapsulating the element of interest; and recording coordinates of the bounding boxes corresponding to the anchor elements in the template user interface image; and obtaining template images of the anchor elements from the template user interface image based on the coordinates of the bounding box encapsulating each of the anchor elements.

4. The method of claim 3, wherein the template images of the anchor elements are obtained when more than one element in the image of the current user interface is matched, beyond a predefined confidence threshold, with the template image of the element of interest.

5. The method of claim 3, wherein identifying the element of interest in the current user interface, upon matching more than one element in the image of the current user interface, beyond a predefined confidence threshold, with the template image of the element of interest, comprises:

identifying at least one of the anchor elements in the image of the current user interface using the template image of the anchor element; and selecting one of the multiple matched elements as the element of interest, wherein the selected element is positioned relative to the anchor element as per relative position of the element of interest and the anchor element in the template user interface image.

6. The method of claim 5, wherein each of the anchor elements is sequentially used till one of the multiple matched elements is selectable as the element of interest, beyond the predefined confidence threshold.

7. The method of claim 6, wherein sequence of considering the anchor elements for selecting one among the multiple matched elements, is in an ascending order of the anchor elements' vicinity to the element of interest in the template user interface image.

8. The method of claim 3, wherein identifying the presence of the anchor elements comprises considering at least one of the potential elements of interest as the anchor element, which is within the predefined vicinity of the bounding box encapsulating the element of interest, in each quadrant defined with the element of interest being at a centre of the quadrant.

9. The method of claim 8, further comprising recording distance between each of the anchor elements and the element of interest, and relative position of each of the anchor elements and the element of interest.

10. The method of claim 1, wherein the template image of the element of interest is derived from the template user interface image once the computing device, of an end user to whom the digital guidance is to be displayed, presents the software application for use to the end user.

11. A non-transitory computer-readable medium for providing digital guidance corresponding to software applications, the non-transitory computer-readable medium storing instructions that, when executed by data processing system comprising one or more processors, performs the steps comprising:

acquiring an image of a current user interface of a software application;

obtaining a template image of an element of interest from a previously processed template user interface image corresponding to the current user interface, wherein obtaining the template image of the element of interest comprises:

obtaining bounding boxes using a plurality of binary images of the template user interface, each of the bounding boxes encapsulating a respective one of a potential element of interest among elements present in the template user interface image; and receiving a selection of at least one of the bounding boxes, wherein the selected bounding box corresponds to the element of interest among the potential element of interest;

identifying the element of interest in the current user interface by using the template image of the element of interest and the image of the current user interface; and displaying digital guidance associated with the element of interest in the current user interface.

12. The non-transitory computer-readable recording medium of claim 11, wherein obtaining the template image of the element of interest further comprises, the instructions causing the data processing system to carry out the steps of:

recording coordinates of the bounding box, in the template user interface image, encapsulating the element of interest; and obtaining the template image of the element of interest from the template user interface image based on the coordinates of the bounding box encapsulating the element of interest.

13. The non-transitory computer-readable recording medium of claim 12, further comprising the instructions causing the data processing system to carry out the steps of:

identifying presence of one or more anchor elements, among the potential element of interest, which are within a predefined vicinity of the bounding box encapsulating the element of interest; and recording coordinates of the bounding boxes corresponding to the anchor elements in the template user interface image; and obtaining template images of the anchor elements from the template user interface image based on the coordinates of the bounding box encapsulating each of the anchor elements.

14. The non-transitory computer-readable recording medium of claim 13, wherein the template images of the anchor elements are obtained when more than one element in the image of the current user interface is matched, beyond a predefined confidence threshold, with the template image of the element of interest.

15. The non-transitory computer-readable recording medium of claim 13, wherein identifying the element of interest in the current user interface, upon matching more than one element in the image of the current user interface, beyond a predefined confidence threshold, with the template image of the element of interest, comprises, the instructions causing the data processing system to carry out the steps of:

identifying at least one of the anchor elements in the image of the current user interface using the template image of the anchor element; and selecting one of the multiple matched elements as the element of interest, wherein the selected element is positioned relative to the anchor element as per relative position of the element of interest and the anchor element in the template user interface image.

16. The non-transitory computer-readable recording medium of claim 15, wherein each of the anchor elements is sequentially used till one of the multiple matched elements is selectable as the element of interest, beyond the predefined confidence threshold.

17. The non-transitory computer-readable recording medium of claim 16, wherein sequence of considering the anchor elements for selecting one among the multiple matched elements, is in an ascending order of the anchor elements' vicinity to the element of interest in the template user interface image.

18. The non-transitory computer-readable recording medium of claim 13, wherein identifying the presence of the anchor elements comprises, the instructions causing the data processing system to carry out the steps of, considering at least one of the potential elements of interest as the anchor element, which is within the predefined vicinity of the bounding box encapsulating the element of interest, in each quadrant defined with the element of interest being at a centre of the quadrant.

19. The non-transitory computer-readable recording medium of claim 18, further comprising the instructions causing the data processing system to carry out the steps of, recording distance between each of the anchor elements and the element of interest, and relative position of each of the anchor elements and the element of interest.

20. The non-transitory computer-readable recording medium of claim 11, wherein the template image of the element of interest is derived from the template user interface image once the computing device, of an end user to whom the digital guidance is to be displayed, presents the software application for use to the end user.

* * * * *